US008922440B2

(12) United States Patent
Schantz et al.

(10) Patent No.: US 8,922,440 B2
(45) Date of Patent: Dec. 30, 2014

(54) SPACE EFFICIENT MAGNETIC ANTENNA METHOD

(75) Inventors: Hans Gregory Schantz, Hampton Cove, AL (US); Robert Edward DePierre, Huntsville, AL (US); James David Fluhler, Madison, AL (US); Kazimierz Siwiak, Coral Springs, FL (US); Glenn Wolenec, Madison, AL (US); Jerome Sylvester Gabig, Brownsboro, AL (US); James Matthew Barron, Huntsville, AL (US)

(73) Assignee: Q-Track Corporation, Huntsville, AL (US)

( * ) Notice: Subject to any disclaimer, the term of this patent is extended or adjusted under 35 U.S.C. 154(b) by 363 days.

(21) Appl. No.: 12/834,821

(22) Filed: Jul. 12, 2010

(65) Prior Publication Data

US 2010/0277387 A1    Nov. 4, 2010

Related U.S. Application Data

(63) Continuation-in-part of application No. 11/473,595, filed on Jun. 23, 2006, now Pat. No. 7,755,552, which is a continuation-in-part of application No. 11/272,533, filed on Nov. 10, 2005, now Pat. No. 7,307,595.

(60) Provisional application No. 60/637,779, filed on Dec. 21, 2004.

(51) Int. Cl.
*H01Q 1/12* (2006.01)
(Continued)

(52) U.S. Cl.
CPC *G01S 5/14* (2013.01); *H01Q 1/273* (2013.01); *H01Q 1/276* (2013.01);
(Continued)

(58) Field of Classification Search
USPC ......... 343/718, 787, 788, 866, 867, 876, 893, 343/895, 900
See application file for complete search history.

(56) References Cited

U.S. PATENT DOCUMENTS

| 716,134 A | 12/1902 | Stone | 342/417 |
|---|---|---|---|
| 1,483,383 A | 2/1924 | Sandell | 455/274 |

(Continued)

FOREIGN PATENT DOCUMENTS

| EP | 1226729 A1 | 7/2002 |
|---|---|---|
| GB | 5811 | 0/1903 |

OTHER PUBLICATIONS

Hertz, Electric Waves, 1893, pp. 109.
Fleming, The Principles of Electric Wave Telegraphy, London: Longmans, Green, and Co., 1908, pp. 31-32.
Morecroft, Principles of Radio Communication, 2nd ed., New York: John Wiley, 1921, pp. 194-203.
Ghirardi, Radio Physics Course, New York: Farrar & Rinehart, 1930, pp. 601-605.

(Continued)

*Primary Examiner* — Douglas W Owens
*Assistant Examiner* — Jae Kim
(74) *Attorney, Agent, or Firm* — James Richards

(57) ABSTRACT

A space efficient magnetic antenna is disclosed for use in tracking, positioning and other applications. In a preferred embodiment, a space efficient magnetic antenna system comprises a first magnetic antenna with a first null axis aligned within a predetermined plane and a second magnetic antenna having a second null axis aligned substantially orthogonal to a first null axis. A second magnetic antenna system lies in a minimal coupling orientation with respect to a first magnetic antenna system. Additionally, a first magnetic antenna may further comprise a plurality of interconnected magnetic antenna elements. A space efficient magnetic antenna system may include an RF module. In further embodiments, the antenna system may enclose a substantial majority of the device including the RF module; the RF module may be enclosed substantially or wholly within one or more antennas of the antenna system.

18 Claims, 16 Drawing Sheets

(51) Int. Cl.
*G01S 5/14* (2006.01)
*H01Q 1/27* (2006.01)
*H01Q 7/00* (2006.01)
*H01Q 7/08* (2006.01)
*H01Q 21/24* (2006.01)
*G01S 5/02* (2010.01)

(52) U.S. Cl.
CPC . *H01Q 7/00* (2013.01); *H01Q 7/08* (2013.01); *H01Q 21/24* (2013.01); *G01S 5/0252* (2013.01)
USPC ............ 343/718; 343/787; 343/788; 343/866

(56) References Cited

U.S. PATENT DOCUMENTS

| | | | | |
|---|---|---|---|---|
| 2,266,262 | A | 12/1941 | Polydoroff | 343/764 |
| 2,282,030 | A | 5/1942 | Busignies | 342/432 |
| 2,339,234 | A | 1/1944 | Polydorff | 343/788 |
| 2,399,382 | A | 4/1946 | Polydorff | 343/788 |
| 2,432,858 | A | 12/1947 | Brown | 343/791 |
| 2,521,550 | A | 9/1950 | Smith | 343/742 |
| 3,046,549 | A | 7/1962 | Kalmus | 342/385 |
| 3,121,228 | A | 2/1964 | Kalmus | 342/488 |
| 3,413,644 | A | 11/1968 | Laub | 343/800 |
| 3,440,542 | A | 4/1969 | Gautney | 455/274 |
| 3,448,440 | A | 6/1969 | Wiegand | 365/244 |
| 3,713,148 | A | 1/1973 | Cardullo et al. | 342/42 |
| 3,868,565 | A | 2/1975 | Kuipers | 324/207.26 |
| 3,983,474 | A | 9/1976 | Kuipers | 324/207.18 |
| 4,054,881 | A | 10/1977 | Raab | 342/448 |
| 4,314,251 | A | 2/1982 | Raab | 342/463 |
| 5,771,438 | A | 6/1998 | Palermo et al. | 455/41.1 |
| 6,060,882 | A | 5/2000 | Doty | 324/318 |
| 6,067,052 | A | 5/2000 | Rawles | 343/741 |
| 6,538,617 | B2 * | 3/2003 | Rochelle | 343/788 |
| 6,720,930 | B2 | 4/2004 | Johnson | 343/742 |
| 6,774,642 | B2 | 8/2004 | Lin et al. | 324/660 |
| 7,321,290 | B2 | 1/2008 | Stevens et al. | 340/10.1 |
| 8,063,844 | B1 | 11/2011 | Pease | 343/788 |
| 2005/0242959 | A1 * | 11/2005 | Watanabe | 340/572.7 |
| 2008/0252538 | A1 | 10/2008 | Ying | 343/767 |

OTHER PUBLICATIONS

Terman, Radio Engineering, 1st ed. New York: McGraw-Hill, 1932, pp. 40-41.
J.A. Goulbourne, HF Antenna Cookbook, 2nd ed. Texas Instruments Technical Application Report 11-08-26-001, Jan. 2004, Fig. 27, p. 19.
HF Antenna Design Notes, Texas Instruments Technical Application Report 11-08-26-003, Sep. 2003, Fig. 3, p. 4.
Schantz, "Origins of RF Based Location Technology" 2011 IEEE Radio and Wireless Symposium (submitted), Jan. 16-20, 2011.
Schantz, "RF Based Location Technology Since World War II" 2011 IEEE Radio and Wireless Symposium (submitted), Jan. 16-20, 2011.
W.J. Polydoroff, *High Frequency Magnetic Materials: Their Characteristics and Principal Applications*, (New York: John Wiley & Sons, 1960), pp. 166-169.
Kalmus, "A new guiding and tracking system," IRE Transactions on Aerospace and Navigational Electronics, Mar. 1962, vol. ANE-9, Issue 12, pp. 7-10.
Raab, "Quasistatic magnetic-field technique for determining position and orientation," IEEE Transactions on Geoscience and Remote Sensing, vol. GE-19, Issue 4, Oct. 1981, pp. 235-245.
Raab et al, "Magnetic position and orientation tracking system," IEEE Transactions on Aerospace and Electronic Systems, vol. AES-15 No. 5, Sep. 1979, pp. 709-717.

* cited by examiner

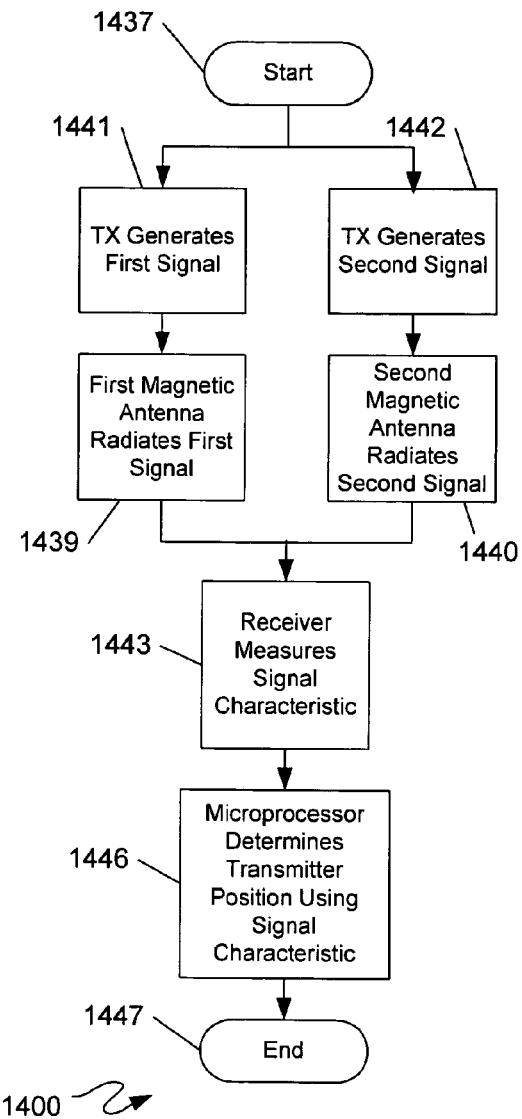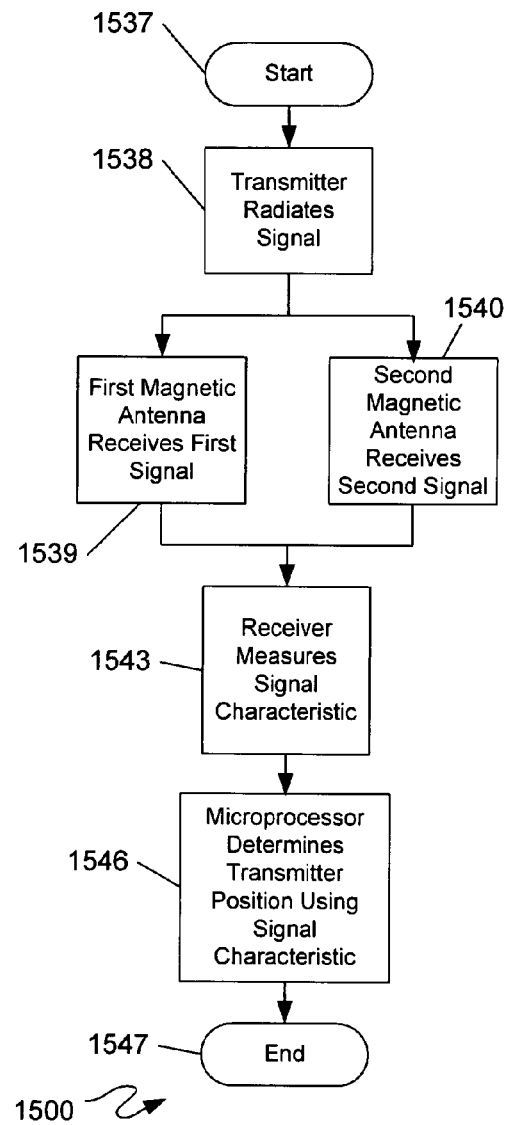
Fig. 14
Fig. 15

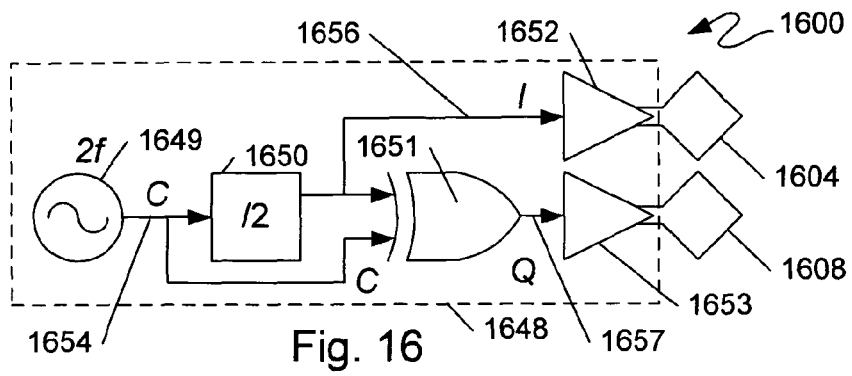
Fig. 16
Fig. 17A
Fig. 17B
Fig. 17C
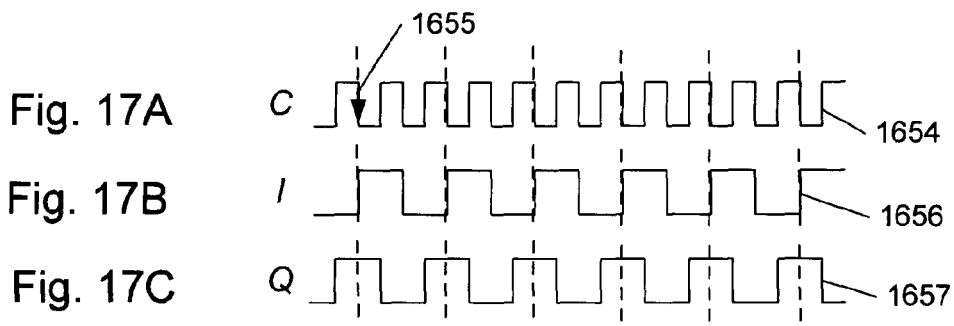
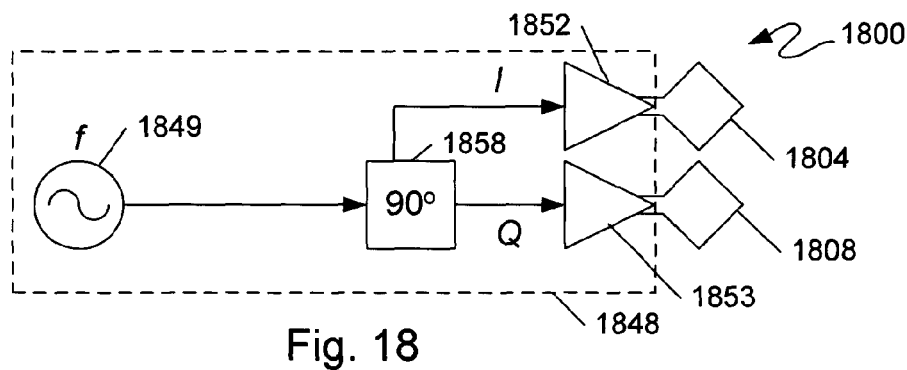
Fig. 18
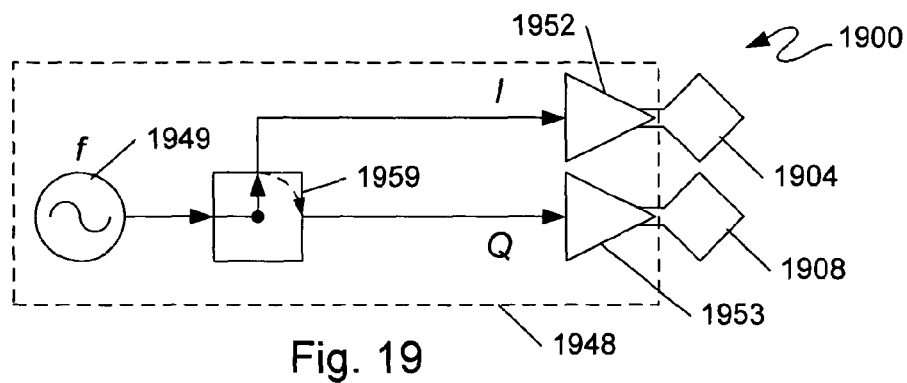
Fig. 19

SPACE EFFICIENT MAGNETIC ANTENNA METHOD

The present application is a continuation in part of U.S. patent application Ser. No. 11/473,595 Titled: "Space Efficient Magnetic Antenna System", filed Jun. 23, 2006 by Schantz et al, which is a continuation-in-part of U.S. patent application Ser. No. 11/272,533 titled: "Near field location system and method," filed Nov. 10, 2005 by Schantz et al., which claims the benefit under 35 USC 119(e) of provisional application Ser. No. 60/637,779, titled: "Near field amplitude positioning system and method," filed Dec. 21, 2004 by Schantz et al., all of which are incorporated herein by reference in their entirety.

RELATED APPLICATIONS

Near field electromagnetic ranging was first fully described in applicant's "System and method for near-field electromagnetic ranging" (U.S. Ser. No. 10/355,612, filed Jan. 31, 2003, now U.S. Pat. No. 6,963,301, issued Nov. 8, 2005), which is incorporated herein by reference in its entirety.

Further details on electromagnetic ranging and positioning are disclosed in U.S. patent application Ser. No. 10/958,165, published as Pub. No. US 2005/0046608 A1 titled "Near field electromagnetic positioning system and method," filed Oct. 4, 2004 by Schantz et al. and U.S. patent application Ser. No. 11/215,699, titled "Low Frequency Asset Tag Tracking System and Method," filed Aug. 30, 2005 by Schantz et al. All of the above listed US patent and patent applications are hereby incorporated herein by reference in their entirety.

GOVERNMENT RIGHTS

This invention was made with Government support under Grant OII-0539073 awarded by the National Science Foundation. The government has certain rights in the invention.

This invention was made with Government support under Grant 2R44OH008952-02 awarded by the NIOSH. The government has certain rights in the invention.

BACKGROUND

1. Field of the Invention

The present invention relates generally to antenna systems, particularly for use in measurement of position or location by means of electromagnetic signaling.

2. Background of the Invention

Magnetic antennas, particularly loopstick antennas, are often used for reception of low frequency signals. FIG. 1 is a circuit diagram showing a prior art loopstick antenna 104. Prior art loopstick antenna 104 comprises primary coil 131, ferrite rod 135, secondary coil 133 and tuning means 132. In alternate embodiments, ferrite rod 135 may be iron, some other ferromagnetic material, or even a non-ferromagnetic material to support primary coil 131. Ferrite rod 135 may also be a bar, cylinder, prism, or other geometric form suitable for supporting primary coil 131. In alternate embodiments ferrite rod may be dispensed with altogether if primary coil 131 is sufficiently stiff to maintain a suitable mechanical shape. Secondary coil 133 provides coupling into primary coil 131 and means by which prior art loopstick antenna 104 may further couple to an RF device.

FIG. 2 is a schematic diagram illustrating a prior art loopstick antenna 104. Primary coil 131 generally comprises turns with normals co-located with loopstick axis 205. Loopstick axis 205 is not only an axis of ferrite rod 135, but also a null axis for prior art loopstick antenna 104. Pattern of prior art loopstick antenna 104 lies generally along pattern axis 207. Pattern axis 207 is substantially orthogonal to loopstick axis 205.

Null axis is a name for an axis referring to a far field pattern for the antenna and is referred to as null axis even though near field coupling may be achieved along the null axis. The null axis is typically the coil winding axis of a conventional cylindrical coil as well as the direction of the antenna moment vector.

A variety of prior art seeks to determine position using signal amplitude, or equivalently signal strength. These efforts are confounded by the impact of typical multi-path heavy environments which act to constructively and destructively combine signals in such a fashion as to render typical signal strength ranging schemes wildly inaccurate. These impacts differ for different building types. Different building types pose different propagation environments for electromagnetic signals and effect a signal strength ranging system in different ways.

Furthermore, existing amplitude or signal strength positioning schemes tend to use sub-optimal antenna arrangements that seriously impact their performance. Existing antenna arrangements are large and bulky or small and inefficient. Other existing antenna arrangements are prone to undesirable coupling to a mobile asset or person being tracked.

BRIEF SUMMARY OF THE INVENTION

These objects and further objects are met by a space efficient antenna system comprising a first magnetic antenna having a first null axis. A first magnetic antenna further comprises a plurality of interconnected magnetic elements each with a null axis substantially parallel to a first null axis.

In further embodiments, a space efficient antenna system may further comprise a second magnetic antenna having a second null axis aligned substantially orthogonal to a first null axis. A second magnetic antenna may lie in a minimal coupling orientation with respect to a first magnetic antenna.

In still other embodiments, a first magnetic antenna comprises a coil wound around a loopstick axis. Turns of the coil lie in planes whose normals lie at a substantial diagonal angle with respect to a loopstick axis.

A space efficient magnetic antenna system may further comprise an RF module with characteristic physical dimensions. A first null axis may lie at a substantial diagonal angle with respect to a dimension of an RF module. A space efficient magnetic antenna system may also be embedded in clothing. An RF module may alternately utilize a first magnetic antenna and a second magnetic antenna, or an RF module may drive a second magnetic antenna in phase quadrature with respect to a first magnetic antenna.

In alternate embodiments, a space efficient magnetic antenna system comprises a first magnetic antenna with a first null axis aligned within a predetermined plane and a second magnetic antenna having a second null axis aligned substantially orthogonal to a first null axis. A second magnetic antenna system lies in a minimal coupling orientation with respect to a first magnetic antenna system. Additionally, a first magnetic antenna may further comprise a plurality of interconnected magnetic antenna elements.

Here again, a space efficient magnetic antenna system may further include an RF module. An RF module may alternately utilize a first magnetic antenna and a second magnetic antenna, or an RF module may drive a second magnetic antenna in phase quadrature with respect to a first magnetic antenna. In still further embodiments, a first null axis may lie at a substantial diagonal angle with respect to a dimension of an RF module. A space efficient magnetic antenna system may further include a third magnetic antenna with a third null axis mutually orthogonal to both a first null axis and a second null axis.

A space efficient magnetic antenna system may include a bar with a principal axis aligned along an axis of symmetry and along a direction of greatest extent of the bar. In alternate embodiments, a magnetic antenna within a system efficient magnetic antenna system may have a null axis not substantially co-parallel with a principal axis.

In still further embodiments, a space efficient magnetic antenna system may include a first magnetic antenna and a second magnetic antenna sharing a common core. A common core may be characterized by a principal axis and a secondary axis with a substantial difference in extent along a secondary axis relative to a principal axis. A space efficient magnetic antenna system may be further combined with an RF module which drives a second magnetic antenna in phase quadrature relative to a first magnetic antenna.

In further embodiments, the antenna system may enclose a substantial majority of the device including the RF module; the RF module may be enclosed substantially or wholly within one or more antennas of the antenna system. One or more antennas of the antenna system may be conformal to a package enclosing the device associated with the antenna system.

BRIEF DESCRIPTION OF THE DRAWINGS

FIG. 14 is a process flow diagram of a positioning system employing a dual magnetic transmit antenna configuration in accordance with the present invention.

FIG. 15 is a process flow diagram of a dual receive antenna positioning process in accordance with the present invention.

FIG. 16 is a block diagram showing a preferred embodiment magnetic antenna transmission system for use in a positioning system FIG. 17A is a timing diagram showing a typical clock (C) signal in a preferred embodiment magnetic antenna transmission system.

FIG. 17B is a timing diagram showing a typical in-phase (I) signal in a preferred embodiment magnetic antenna transmission system.

FIG. 17C is a timing diagram showing a typical quadrature (Q) signal in a preferred embodiment magnetic antenna transmission system.

FIG. 18 is a block diagram showing a first alternate embodiment magnetic antenna transmission system for use in a positioning system.

FIG. 19 is a block diagram showing a second alternate embodiment magnetic antenna transmission system for use in a positioning system.

DETAILED DESCRIPTION OF THE PREFERRED EMBODIMENTS

Overview of the Invention

The present invention is directed to a near field location system and method. The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art. Like numbers refer to like elements throughout.

Near Field Propagation

Figure 3A:
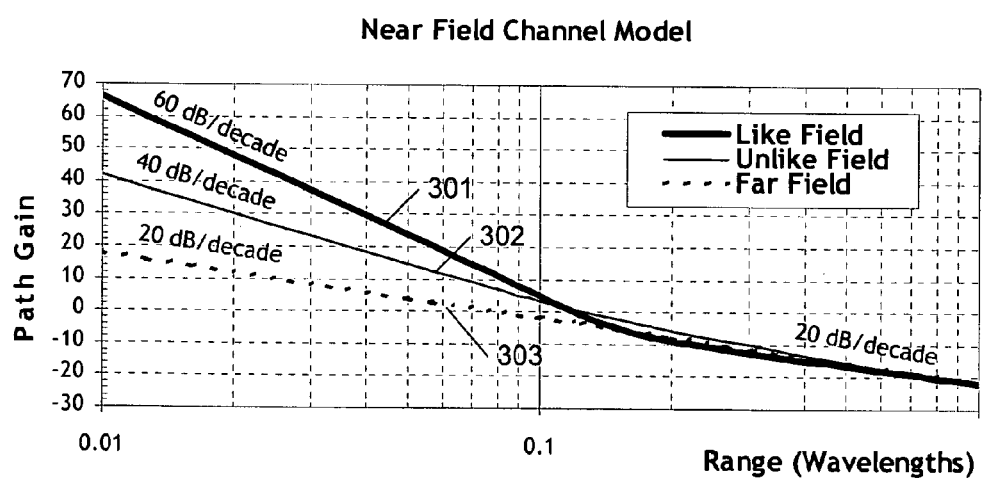
FIG. 3A is plot of path gain versus range in free space for electric and magnetic signals from a small electric transmit antenna as electric and magnetic signals transition from the near field to the far field.

A near field location system may rely on certain properties of near field electromagnetic signals. FIG. 3A is plot of path gain versus range in free space for electric and magnetic signals from a small electric transmit antenna as electric and magnetic signals transition from the near field to the far field. At a range approximately equal to about one sixth of a wavelength ($\lambda/2\pi$), electromagnetic signals from electrically small antennas in free space transition between near field to far field behavior. In the near field zone, within $\lambda/2\pi$, "like" signals decrease in amplitude 60 dB for every decade (factor of ten) increase in range, as shown in trace 301. "Like" signals are signals received by an antenna of the same type of design e.g. electric fields received by electric field antenna such as a dipole or whip antenna or magnetic fields received by a magnetic antenna such as a loop or loopstick antenna. Also in the near field zone, "unlike" signals (electric signals from magnetic antennas or magnetic signals from electric antennas) decrease in amplitude 40 dB for every decade increase in range, as shown in trace 302. In the transition region around $\lambda/2\pi$, both like and unlike signals transition to far field behavior in which signals decrease in amplitude 20 dB for every decade increase in range, as shown in trace 303. This transition is essentially complete once signals propagate one wavelength ($1\lambda$). Thus it is advantageous for a signal strength positioning system to operate at ranges on the order of $1\lambda$ or less. Conversely it is advantageous for a signal strength positioning system to operate at a frequency chosen so that a corresponding wavelength is longer than a typical range for a relevant propagation environment.

In a typical office or industrial environment, signals are bound by conducting planes in the floor and ceiling like reinforcement rod structures, metallic pans or metallic sheathing. In this "parallel plate" environment, vertically polarized signals tend to propagate better than horizontally polarized signals. In alternate embodiments one may take advantage of the ability of the propagation environment to shift some energy from one polarization to the other. For instance, a horizontally polarized transmit signal may couple to a propagation environment resulting in adequate vertical polarized energy to be detected by a vertically polarized receive system.

Figure 3B:
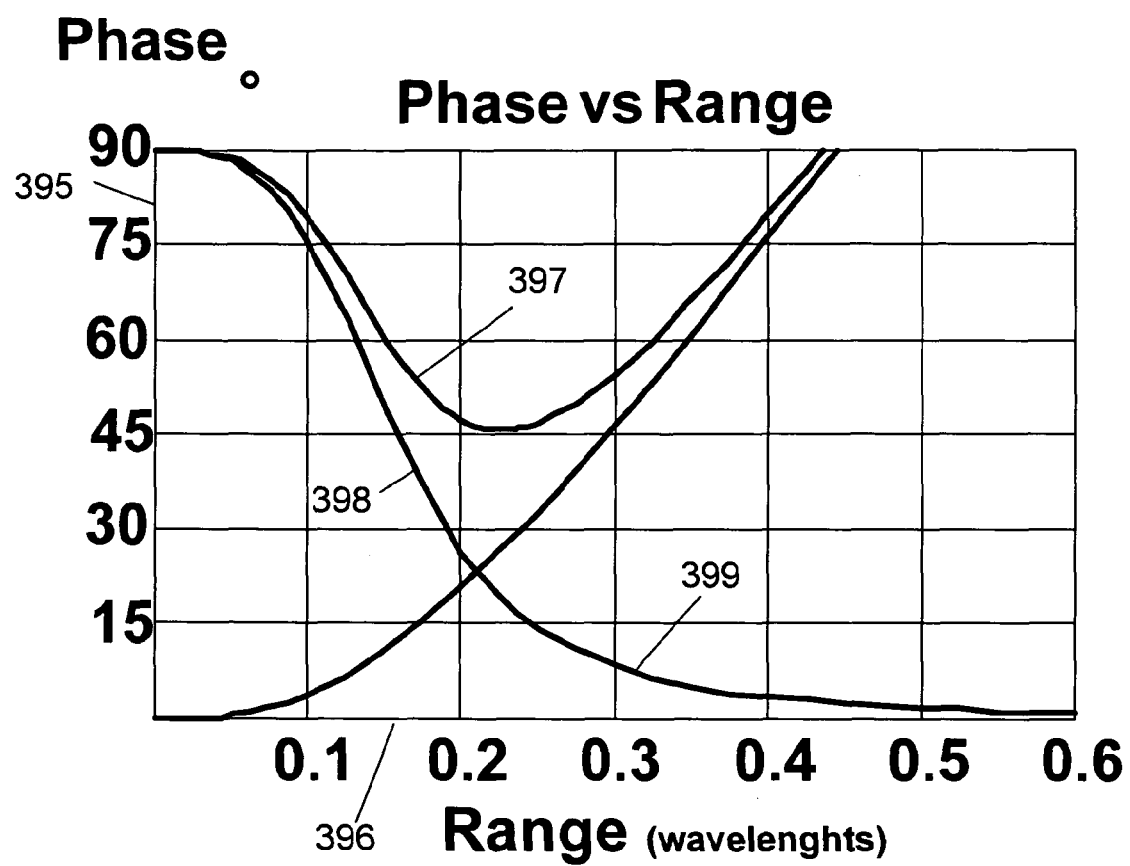
FIG. 3B is a graphic representation of electric and magnetic field phase relationships as a function of range for an ideal electrically small loop in free space.

FIG. 3B is a graphic representation of electric and magnetic field phase relationships as a function of range for an ideal electrically small loop in free space. FIG. 3B includes a magnetic or H-Field phase curve 397, an electric or E-Field phase curve 398 and a phase difference or $\Delta\phi$ curve 399 representing the difference between curves 397, 398. Curves 397, 398, 399 are plotted against a first axis 395 representing phase (preferably in degrees) as a function of range represented on a second axis 396 in wavelength (preferably in a kilogram-meter-second unit, such as meters) of an electromagnetic signal under consideration. H-field phase curve 397 begins 90° out of phase with respect to E-field phase 398. As range is increased from about 0.05λ to about 0.50λ, H-field phase curve 397 initially decreases, and then increases. Similarly, as range is increased from about 0.05λ to about 0.50λ, E-field phase curve 398 increases, gradually at first, and at an increasing rate as range increases. The difference between E-field phase curve 398 and H-field phase curve 397 is represented by $\Delta\phi$ curve 399. $\Delta\phi$ curve 399 begins at approximately 90° (i.e., at phase quadrature) in the near-field within a range of about 0.05λ and goes to 0° (i.e., phase synchronicity) as the far-field is approached, past a range of about 0.50λ. Transition of $\Delta\phi$ curve 399 from phase quadrature to phase synchronicity between about 0.05λ to about 0.50λ is substantially continuous and predictable and is used to advantage by the present invention. With more precise measurement, this phase transition can be beneficially used at ranges inside 0.05λ and outside 0.50λ to 1.0λ or more. Further details regarding the use of phase in near field location systems may be found in U.S. patent application Ser. No. 10/355,612, titled "System and Method for Near-Field Electromagnetic Ranging," filed Jan. 31, 2003, by Schantz et al., now U.S. Pat. No. 6,963,301, issued Nov. 8, 2005, which has been incorporated herein by reference. Thus, in accordance with the present invention near field signal propagation properties as evidenced by, for example, amplitude or phase or relative amplitude or relative phase or other characteristics, may be used to determine a location. Near field properties may be used in combination with far field properties to extend the range of a location system.

Figure 4:
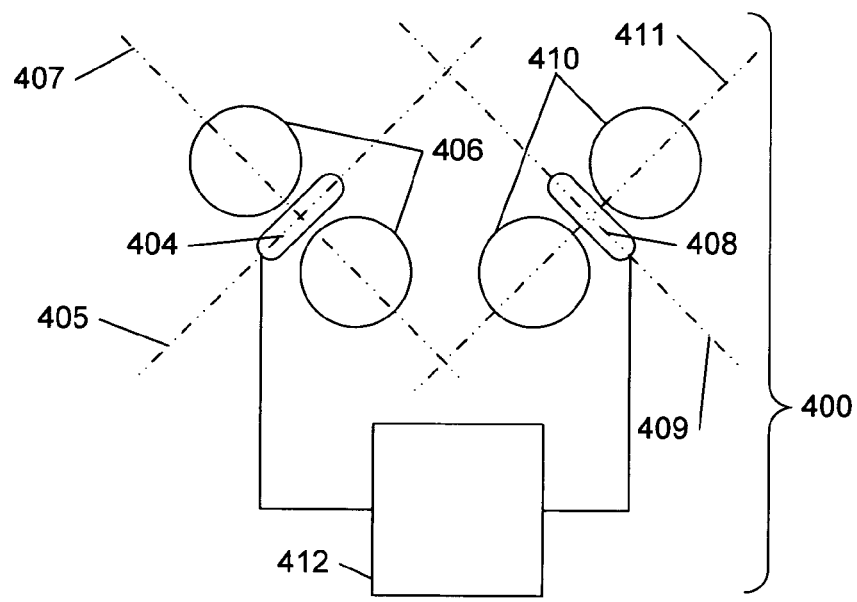
FIG. 4 is a schematic diagram describing orientation and antenna patterns of a radio frequency (RF) tracking device.

FIG. 4 is a schematic diagram describing orientation and antenna patterns of a radio frequency (RF) tracking device 400. RF tracking device 400 comprises first magnetic antenna 404, second magnetic antenna 408, and RF module 412. RF module 412 may be a transmitter, a receiver, or a transceiver. RF module 412 may further include additional modules useful for RF tracking device 400. First magnetic antenna 404 has a first pattern 406 generally aligned along first pattern axis 407 and with a null generally aligned along first null axis 405. Second magnetic antenna 408 has a second pattern 410 generally aligned along second pattern axis 411 and with a null generally aligned along second null axis 409. First pattern axis 407 is substantially orthogonal to second pattern axis 411. Similarly, first null axis 405 is substantially orthogonal to second null axis 409. First pattern axis 407, second pattern axis 411, first null axis 405 and second null axis 409 lie substantially within and define an azimuthal or horizontal plane. First pattern 406 and second pattern 410 are both substantially vertically polarized patterns in the vicinity of the azimuthal plane. Thus first pattern 406 and second pattern 410 jointly provide full vertical polarization coverage of the azimuthal plane. In a preferred embodiment, first magnetic antenna 404 and second magnetic antenna 408 are loopstick antennas. In alternate embodiments first magnetic antenna 404 and second magnetic antenna 208 may be loop antennas or other magnetic antennas. First magnetic antenna 404 and second magnetic antenna 408 are arranged "orthogonally" in that their corresponding null axes (first null axis 405 and second null axis 409) are substantially orthogonal to each other.

Figure 5:
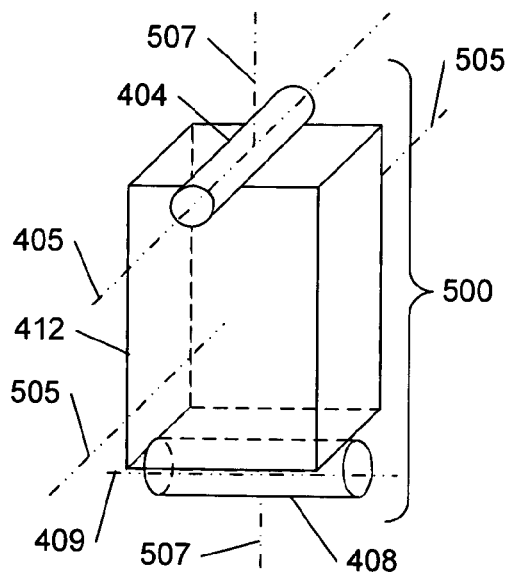
FIG. 5 is a schematic diagram describing a first embodiment of an RF tracking device.

FIG. 5 is a schematic diagram describing a first embodiment of an RF tracking device 500, utilizing parallel and perpendicular magnetic antennas. FIG. 5 illustrates one configuration of the elements of FIG. 4. The RF module 412 is shown generally as a rectangle having characteristic physical dimensions, length, width, and height and associated axes. Although a rectangle is shown, any shape, as may be desired for commercial appearance or as needed for other reasons, may be used. First embodiment of RF tracking device 500 comprises first magnetic antenna 404, second magnetic antenna 408, and RF module 412. First magnetic antenna 404 is generally aligned with a null along first null axis 405 and second magnetic antenna 408 is generally aligned along second null axis 409. First null axis 405 and second null axis 409 are substantially orthogonal to each other. First null axis 405 is also substantially co-parallel with normal 505 to RF module 412. First null axis 405 and second null axis 409 lie substantially within an azimuthal plane whose normal is vertical axis 507. Thus, first magnetic antenna 404 and second magnetic antenna 408 can cooperate to yield substantially vertically polarized patterns in the vicinity of the azimuthal plane as will be further disclosed in this document. Throughout, it should be understood that terms like vertical are meant for purposes of description and not limitation, and the overall configuration described for RF tracking device 500 may be used in a wide variety of orientations.

Figure 6:
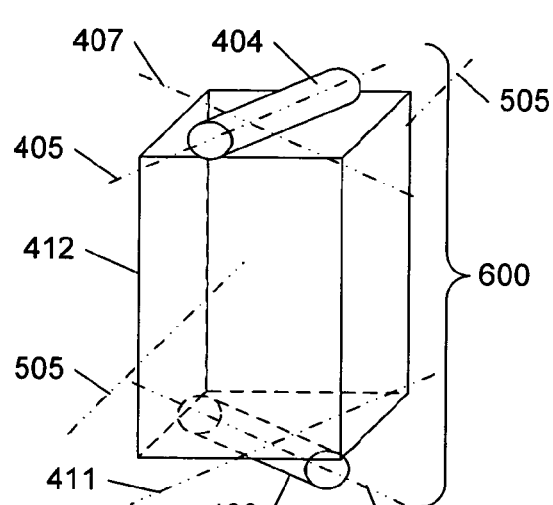
FIG. 6 is a schematic diagram showing second embodiment of an RF tracking device

FIG. 6 is a schematic diagram showing second embodiment of an RF tracking device 600 utilizing diagonally oriented magnetic antennas. FIG. 6 illustrates an alternate configuration of the elements of FIG. 4. Second embodiment of a RF tracking device 600 comprises first magnetic antenna 404, second magnetic antenna 408, and RF module 412. First magnetic antenna 404 is generally aligned with a null along first null axis 405 and second magnetic antenna 408 is generally aligned along second null axis 409. First null axis 405 and second null axis 409 are substantially orthogonal to each other. First null axis 405 is also oriented at a diagonal angle of approximately 45 degrees with respect to normal 505 of RF module 412. Such an orientation yields a compact form factor for RF tracking device 600. The 45 degree angle shown is exemplary. Other angles may be used, and the particular angle chosen may depend on the actual shape of the RF module 412 among other factors. Here again, first magnetic antenna 404 and second magnetic antenna 408 can cooperate to yield substantially vertically polarized patterns in the vicinity of the azimuthal plane.

Figure 7A:
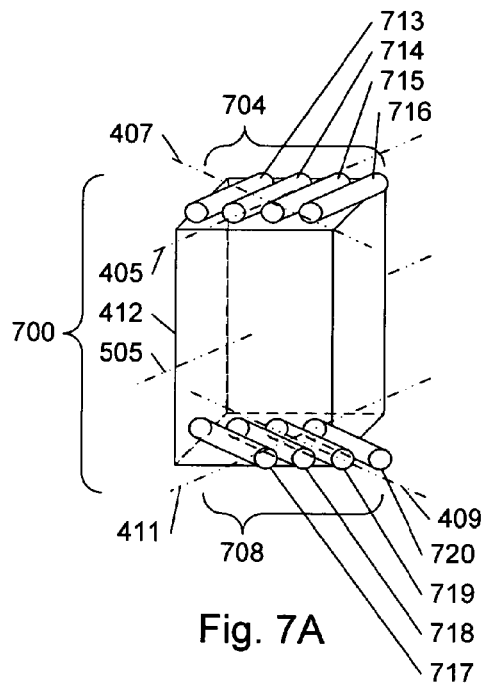
FIG. 7A is a schematic diagram describing a preferred embodiment RF tracking device

FIG. 7A is a schematic diagram describing a preferred embodiment RF tracking device 700 utilizing multiple diagonal magnetic antenna elements. The use of diagonal antennas reduces package size; the use of multiple diagonal antenna elements further improves package size and form factor by reducing the maximum dimensions of the package and eliminating protrusions. In alternate embodiment, multiple antenna elements may be used in the non-diagonal arrangement of FIG. 5. Referring to FIG. 7A, preferred embodiment RF tracking device 700 comprises first magnetic antenna system 704, second magnetic antenna system 708, and RF module 412. The system of FIG. 7A corresponds to the system of FIG. 4, with alternate antenna system 704 corresponding to antenna 404 of FIG. 4 and antenna system 708 corresponding to antenna 408 of FIG. 4. First magnetic antenna system 704 is generally aligned with a null along first null axis 405 and second magnetic antenna system 708 is generally aligned along second null axis 409. First null axis 405 and second null axis 409 are substantially orthogonal to each other. First null axis 405 is also oriented at approximately 45 degrees with respect to normal 505 of RF module 412.

First magnetic antenna system 704 further comprises first magnetic antenna component 713, second magnetic antenna component 714, third magnetic antenna component 715, and fourth magnetic antenna component 716 (collectively, "first set of magnetic antenna components"). A first set of magnetic antenna components are all generally aligned so as to have nulls generally along first null axis 405 and constructive addition of patterns generally along first pattern axis 407. First magnetic antenna system 704 is depicted as having four components for purpose of illustration and not limitation. In alternate embodiments, first magnetic antenna system 704 may further comprise more than four components or less than four components.

Second magnetic antenna system 708 further comprises fifth magnetic antenna component 717, sixth magnetic antenna component 718, seventh magnetic antenna component 719, and eighth magnetic antenna component 720 (collectively, "second set of magnetic antenna components"). A second set of magnetic antenna components are all generally aligned so as to have nulls generally along second null axis 409 and constructive addition of patterns generally along second pattern axis 411. Second magnetic antenna system 708 is depicted as having four components for purpose of illustration and not limitation. In alternate embodiments, second magnetic antenna system 708 may further comprise more than four components or less than four components. First magnetic antenna system 704 and second magnetic antenna system 708 yield a compact form factor for RF tracking device 700.

Figure 7B:
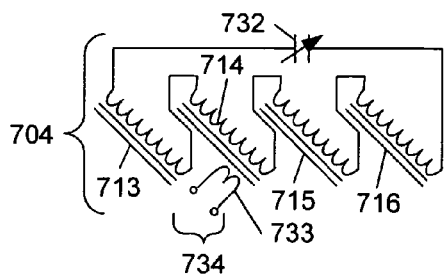
FIG. 7B is a circuit diagram describing a first potential circuit implementation of magnetic antennas for a preferred embodiment RF tracking device.

FIG. 7B is a circuit diagram describing a first potential circuit implementation of magnetic antennas for a preferred embodiment RF tracking device 700. First magnetic antenna system 704 further comprises first magnetic antenna component 713, second magnetic antenna component 714, third magnetic antenna component 715, fourth magnetic antenna component 716, secondary coupling coil 733, and tuning means 732. Tuning means 732 may be a variable capacitor, a varactor, a switched capacitance bank or any other means by which first magnetic antenna system 704 may be tuned. Secondary coupling coil 733 cooperates with one of the magnetic antenna components, such as magnetic antenna component 714, to couple signals between first magnetic antenna system 704 and RF module 412. Coupling coil terminals 734 provide means by which signals may be coupled intermediate RF module 412 and secondary coupling coil 733.

First magnetic antenna component 713, second magnetic antenna component 714, third magnetic antenna component 715, and fourth magnetic antenna component 716 are all generally aligned so as to have constructive addition of patterns generally along first pattern axis 407. If a magnetic antenna component were reversed relative to other magnetic antenna components, it is possible to achieve an undesired destructive combination of patterns. From an electrical point of view, first magnetic antenna system 704 may be thought of as a series combination of first magnetic antenna component 713, second magnetic antenna component 714, third magnetic antenna component 715, and fourth magnetic antenna component 716. In alternate embodiments, parallel or other more complicated combinations are possible.

Figure 7C:
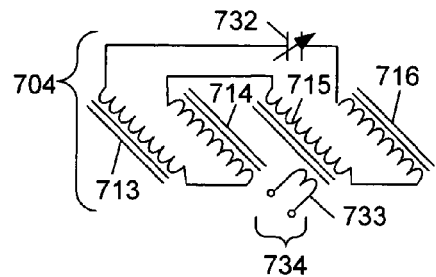
FIG. 7C is a circuit diagram describing a second potential circuit implementation of magnetic antennas for a preferred embodiment RF tracking device.

FIG. 7C is a circuit diagram describing a second potential circuit implementation of magnetic antennas for a preferred embodiment RF tracking device 700. In this second potential circuit implementation, first magnetic antenna system 704 also further comprises first magnetic antenna component 713, second magnetic antenna component 714, third magnetic antenna component 715, and fourth magnetic antenna component 716, secondary coupling coil 733, and tuning means 732.

In FIG. 7C, the orientation of second magnetic antenna component 714 and fourth magnetic antenna component 716 have been reversed with respect to the orientation of first magnetic antenna component 713 and third magnetic antenna component 715. However, using an alternate circuit arrangement depicted in FIG. 7C recovers a desired constructive superposition of patterns.

Figure 8:
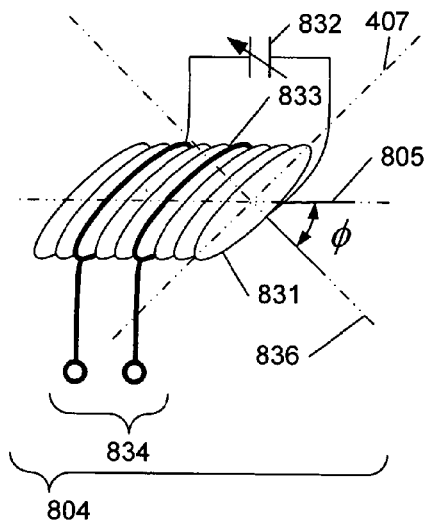
FIG. 8 is a schematic diagram presenting a slanted loopstick antenna.

FIG. 8 is a schematic diagram presenting a slanted loopstick antenna 804. Slanted loopstick antenna 804 comprises slanted primary coil 831, secondary coupling coil 833 and tuning means 832. Slanted primary coil 831 is generally aligned with loopstick axis 805. Loopstick axis 805 is the rotational axis of a coil form which may be used to form the slanted primary coil 831. (The coil form itself is optional or may be removed after forming the coil.) Slanted primary coil 831 comprises turns substantially centered with loopstick axis 805 yet oriented so that turn normal 836 is aligned at an angle $\phi$ with respect to loopstick axis 805. "Turn normal 836" refers to an axis normal to a plane substantially containing the turn. Orienting turn normal 836 at an angle $\phi$ with respect to loopstick axis 805 shifts null axis 409 so as to orient the null axis 409 parallel to turn normal 836 at an angle $\phi$ with respect to loopstick axis 805. Similarly, pattern axis 407 remains orthogonal to null axis 409. Thus slanted loopstick 804 has pattern axis 407 no longer substantially orthogonal to loopstick axis 805.

In alternate embodiments, slanted loopstick antenna may further comprise a ferrite rod (not shown), however a ferrite rod collinear with the loopstick axis 805 may tend to create a potentially undesired shift of pattern axis 407 toward loopstick axis 805. A ferrite rod will have the potentially advantageous effect of increasing inductance and decreasing vulnerability to undesired coupling, such as to nearby objects.

Figure 9:
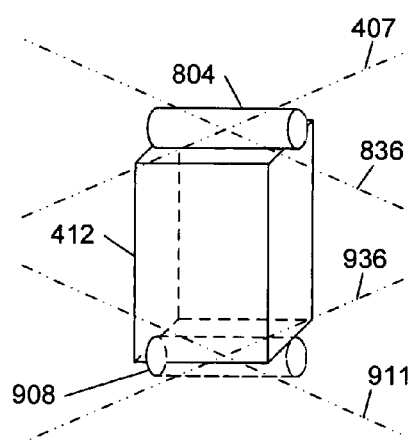
FIG. 9 is a schematic diagram describing a slanted loopstick RF tracking device

FIG. 9 is a schematic diagram describing a slanted loopstick RF tracking device 900. Slanted loopstick RF tracking device 900 comprises first slanted loopstick 804, second slanted loopstick 908, and RF module 412. First slanted loopstick 804 is constructed so as to align first pattern axis 407 at an angle 90-$\phi$ degrees with respect to normal 905 to RF module 412. The angle $\phi$ may be, for example, 45 degrees. First pattern axis 407 and first pattern null 836 lie substantially within a first azimuthal plane. Second slanted loopstick 908 is constructed so as to align second pattern axis 911 at an angle $\phi$ degrees with respect to normal 905. Second pattern axis 911 and second pattern null 936 lie substantially within a second azimuthal plane parallel to the first azimuthal plane. Because the two azimuthal planes and respective loopstick antennas 804, 908 are separated by a small distance relative to the typical ranging distance for the device 900 in use, the two antennas 804, 908 respond essentially as coplanar antennas. Thus, first slanted loopstick 804 and second slanted loopstick 908 have generally orthogonal patterns that, in combination, can provide full vertical polarization coverage for objects near either of the azimuthal planes.

Figure 10A:
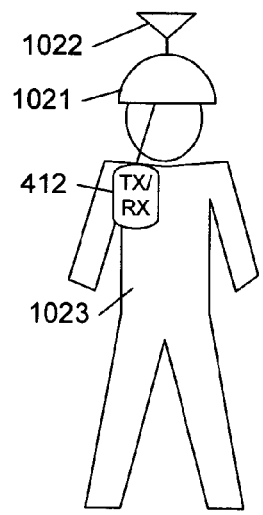
FIG. 10A is a schematic diagram depicting a first configuration of a body mounted electric field antenna.

FIG. 10A is a schematic diagram depicting a first configuration of a body mounted electric field antenna. Positioning system antennas may be subject to undesired coupling to nearby objects, resulting in undesired amplitude and/or phase signal measurements further resulting in position measurement errors. In body mounted systems for tracking people, body coupling can result in significant errors. Body coupling can be minimized by including antennas in accordance with the present invention.

A first configuration of a body mounted electric field antenna comprises monopole element 1022 driven against helmet counterpoise 1021. Alternatively, this arrangement may be thought of as a dipole comprising monopole element 1022 as one element and helmet counterpoise 1021 as another element. First configuration of a body mounted electric field antenna avoids undesired coupling to human body 1023 by placing monopole element 1022 and helmet counterpoise 1021 relatively far away from human body 1023. RF module 412 may be carried on human body 1023 wherever convenient.

Figure 10B:
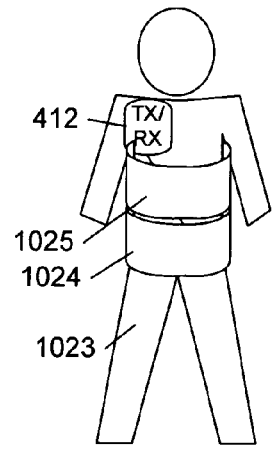
FIG. 10B is a schematic diagram depicting a second configuration of a body mounted electric field antenna.

FIG. 10B is a schematic diagram depicting a second configuration of a body mounted electric field antenna. The second configuration of a body mounted electric field antenna comprises a first dipole element 1024 driven against a second dipole element 1025. Second configuration of a body mounted electric field antenna avoids undesired coupling to the human body 1023 by enclosing the human body 1023 substantially within the first dipole element 1024 and the second dipole element 1025. RF module 412 may be carried on the human body 1023 wherever convenient. The first dipole element 1024 and the second dipole element 1025 may be embedded in clothing such as a shirt or coat. In alternate embodiments, the first dipole element 1024 may be embedded in pants and second dipole element 1025 may be embedded in a shirt or coat.

Figure 10C:
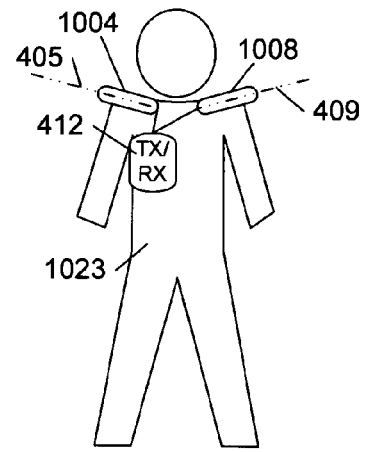
FIG. 10C is a schematic diagram showing a potential configuration of a body mounted magnetic field antenna system.

FIG. 10C is a schematic diagram showing a potential configuration of a body mounted magnetic field antenna system. A body mounted magnetic field antenna system comprises first magnetic antenna 1004 and second magnetic antenna 1008. First magnetic antenna 1004 is generally aligned with a null along first null axis 405 and second magnetic antenna 1008 is generally aligned along second null axis 409. First null axis 405 is substantially orthogonal to second null axis 409. First null axis 405 and second null axis 409 lie substantially within a common azimuthal plane. A body mounted magnetic field antenna system provides omni-directional vertical polarization coverage throughout an azimuthal plane. An advantage of a magnetic field antenna is that a magnetic field antenna is less likely to have undesired body coupling. A preferred location for body mounted magnetic field antennas is in proximity to a wearer's shoulders, away as much as practical from any ferromagnetic materials such as a steel tank, such as an air tank as typically worn by a fire fighter or hazardous materials worker.

A single magnetic field antenna positioned to accept vertically polarized signals will not be omni-directional in a horizontal plane. Omnidirectional coverage may be achieved by utilizing multiple vertically polarized magnetic antennas in accordance with the present invention. RF module 412 may be carried on human body 1023 wherever convenient.

Figure 11:
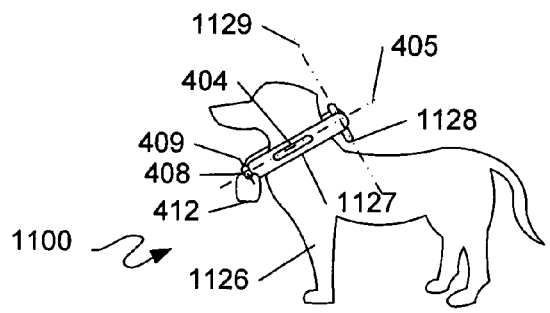
FIG. 11 is a schematic diagram describing a potential configuration of a canine magnetic field antenna system.

FIG. 11 is a schematic diagram describing a potential configuration of a canine magnetic field antenna system 1100. Canine magnetic field antenna system 1100 comprises a first magnetic antenna 404, and a second magnetic antenna 408 embedded in a collar 1127. In alternate embodiments, the collar 1127 may be a harness or other structure that fastens to a dog 1126 or other animal. The first magnetic antenna 404 is generally aligned with a null along the first null axis 405 and the second magnetic antenna 408 is generally aligned with the null along the second null axis 409. The first null axis 405 is substantially orthogonal to the second null axis 409. In still further embodiments, the canine magnetic field antenna system 1100 may be supplemented by a third magnetic antenna 1128 generally oriented so as to align a null with a third null axis 1129. The third null axis 1129 is generally aligned so as to be mutually orthogonal with both the first null axis 405 and the second null axis 409. In conjunction with RF module 412, canine magnetic field antenna system 1100 contributes to a system for tracking and monitoring the whereabouts of the dog 1126. Although in a preferred embodiment canine magnetic field antenna system 1100 is mounted on the dog 1126, in alternate embodiments the canine magnetic field antenna system may be employed with a cat, horse, cow, or other domestic or wild animal whose whereabouts are of interest. Canine magnetic field antenna system 1100 may be part of a system that monitors the location of an animal and emits noises or electric shocks as a deterrent if an animal attempts to leave a defined safe area or enter a defined prohibited area. In one embodiment, a prohibited area may be defined using another mobile tracking unit. Thus prohibited areas may be dynamically changing. For example, a prohibited area for a first dog may be defined as being a predefined two meter radius from a person or a one meter radius from a second dog. In operation, the first dog could be prohibited from coming closer than the predefined radius from the person or second dog, even though the person or second dog may move around. The three antenna configuration of the canine magnetic field antenna system 1100 may be advantageously used in any context in which orientation of a tag may be arbitrary.

Figure 12:
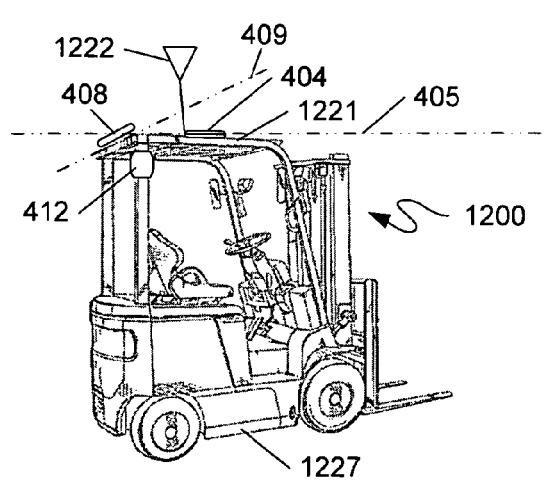
FIG. 12 illustrates one embodiment of a positioning system including a forklift

FIG. 12 illustrates one embodiment of a positioning system including a forklift Forklift positioning system 1200 may include one or more of a first magnetic antenna 404, a second magnetic 408, and/or an electric antenna 1222. First magnetic antenna 404 is generally aligned with a null along first null axis 405 and second magnetic antenna 408 is generally aligned along second null axis 409. First null axis 405 is substantially orthogonal to second null axis 409. Electric antenna 1222 may be a dipole, but is preferentially a monopole element driven against counterpoise 1221, which may be the top of the forklift 1227 as shown. RF module 412 may be mounted wherever convenient. In one embodiment, the forklift positioning system 1200 may comprise the first magnetic antenna 404 and the second magnetic antenna 408. In another embodiment, the forklift antenna system 1200 may comprise the electric antenna 1222. In still a further embodiment, the forklift antenna system 1200 may comprise the first magnetic antenna 404, the second magnetic antenna 408, and the electric antenna 1222.

Figure 13:
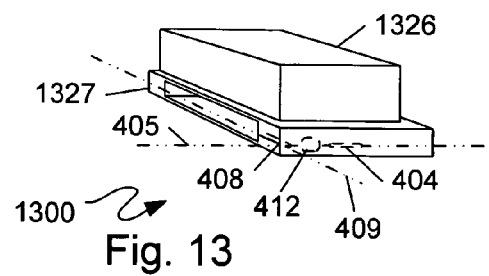
FIG. 13 is a schematic diagram depicting a potential configuration of a pallet magnetic field antenna system.

FIG. 13 is a schematic diagram depicting a potential configuration of a pallet magnetic field antenna system 1300. Pallet magnetic field antenna system 1300 comprises first magnetic antenna 404, and second magnetic antenna 408 embedded in pallet 1327. In alternate embodiments, pallet 1327 may be a box, bin, carton, or other container of assets, such as asset 1326, whose whereabouts are of interest. First magnetic antenna 404 is generally aligned with a null along first null axis 405 and second magnetic antenna 408 is generally aligned along second null axis 409. First null axis 405 is substantially orthogonal to second null axis 409.

FIG. 14 is a process flow diagram of a positioning system employing a dual magnetic transmit antenna configuration in accordance with the present invention. Magnetic antenna system transmission process 1400 begins at a START locus 1437.

The dual magnetic transmit antenna positioning process 1400 continues with the step of, in no particular order, (1) a first transmitter generating a first signal as indicated in block 1441 and a first magnetic antenna radiating the first signal as indicated in block 1439, and (2) a second transmitter generating a second signal as indicated in block 1442 and a second magnetic antenna radiating the second signal as indicated in block 1440.

In a preferred embodiment, the first magnetic antenna and the second magnetic are aligned so as to have substantially orthogonal patterns. Also in a preferred embodiment, the first signal (I) and a second signal (Q) are in quadrature (i.e. a ninety degree phase shift with respect to each other). In an alternative embodiment, the first signal and second signal are transmitted alternately, one at a time at a predetermined rate or according to a predetermined pattern. If the first signal and the second signal alternate on a time scale short with respect to the receiver response time scale (i.e. the receiver averages multiple transmissions), then magnetic antenna system transmission process 1400 can achieve an effective omnidirectional vertical polarization radiation pattern, i.e., the system response is substantially the same for any azimuth angle. Thus, the dual magnetic antenna configuration, when driven in accordance with the present invention, can result in the equivalent of a substantially omnidirectional response pattern.

The dual transmit antenna positioning process 1400 continues with the step of a receiver measuring at least one signal characteristic as denoted in block 1443. At least one signal characteristic may include an amplitude of a signal or a phase of a signal. In alternate embodiments, at least one signal characteristic may include an amplitude or a phase of an electric signal or a magnetic signal. An electric signal is a signal received by an electric antenna like a monopole, a dipole, or a whip, while a magnetic signal is a signal received by a magnetic antenna like a loop or a loopstick.

The dual transmit antenna positioning process 1400 continues with the step of a microprocessor determining transmitter position using at least one signal characteristic as indicated in block 1446. The dual transmit antenna positioning process 1400 terminates at an END locus 1447.

FIG. 15 is a process flow diagram of a dual receive antenna positioning process. The process 1500 begins at a START locus 1537, and continues with the step of a transmitter transmitting a transmitted signal as indicated in block 1538.

The process 1500 continues with the step of, in no particular order, (1) a first magnetic antenna receiving the transmitted signal to generate a first received signal, as indicated in block 1539, and (2) a second magnetic antenna receiving the transmitted signal to generate a second received signal, as indicated in block 1540. The process 1500 continues with the step of a receiver determining at least one signal characteristic from the first and second received signals, as shown in block 1543.

The dual receive antenna positioning process 1500 continues with the step of a microprocessor determining transmitter position using the signal characteristic. The signal characteristic may include an amplitude of a signal or a phase of a signal. In alternate embodiments, the signal characteristic may include an amplitude or a phase of an electric signal or a magnetic signal. An electric signal is a signal received by an electric antenna like a monopole, a dipole, or a whip, while a magnetic signal is a signal received by a magnetic antenna like a loop or a loopstick. The process 1500 terminates at an END locus 1547.

FIG. 16 is a block diagram showing a preferred embodiment magnetic antenna transmission system 1600 for use in a positioning system. Magnetic antenna transmission system 1600 comprises oscillator 1649, divide by two divider 1650, XOR gate 1651, first power amplifier 1652, second power amplifier 1653, first magnetic antenna 1604, and second magnetic antenna 1608. In a preferred embodiment, first magnetic antenna 1604, and second magnetic antenna 1608 are arranged orthogonally. Transmitter system 1648 comprises oscillator 1649, divide by two divider 1650, XOR gate 1651, first power amplifier 1652, and second power amplifier 1653. Transmitter system 1648 is an example of an RF module, such as RF module 412.

Oscillator 1649 operates at twice a desired frequency f to yield a clock signal C. Divide by two divider 1650 takes clock signal C at frequency 2 f and divides it by two to yield an in-phase signal I at frequency f. XOR gate 1651 accepts clock signal C as a first input and in-phase signal I as a second input. XOR gate 1651 yields quadrature output signal Q. Quadrature output signal Q is shifted ninety degrees with respect to in-phase signal I. First power amplifier 1652 amplifies in-phase signal I and conveys it to first magnetic antenna 1604. Second power amplifier 1653 amplifies quadrature signal Q and conveys it to second magnetic antenna 1608. Feeding a first in-phase signal I to first magnetic antenna 1604 and a second quadrature signal Q to second magnetic antenna 1608 enables a preferred embodiment magnetic antenna transmission system 1600 to radiate substantially omnidirectional vertically polarized electromagnetic waves.

First power amplifier 1652 and second power amplifier 1653 may further include filtering means, matching means, or power control means. Filtering means include high pass, low pass, band pass or band notch filters such as are generally understood by practitioners of the RF arts. Filtering means enable first power amplifier 1652 and second power amplifier 1653 to deliver appropriate frequency components to first magnetic antenna 1604 and second magnetic antenna 1608. Matching means include impedance transformation and balun transformation. Power control means allow output power of first power amplifier 1652 and second power amplifier 1653 to be adjusted so as to meet a desired power specification such as one imposed by a regulatory limit.

Preferred embodiment magnetic antenna transmission system 1600 is particularly useful for a positioning system operating at relatively low frequencies such as those less than 2 MHz. At relatively low frequencies it is relatively easy to generate a clock signal at twice a frequency of interest. The inventors have successfully used direct digital synthesis. A variety of other techniques are possible including other digital techniques, quartz oscillators, multi-vibrators, synthesizers, LC oscillators and other oscillators. At higher frequencies it becomes more difficult to generate a clock signal at twice a frequency of interest. For these higher frequencies, alternate embodiments using a clock or oscillator operating at the frequency of interest become more attractive.

FIG. 17A is a timing diagram showing a typical clock signal 1654 in a preferred embodiment magnetic antenna transmission system. Clock signal 1654 toggles at a frequency 2f for a magnetic antenna transmission system 1600 where transmission at a frequency f is desired. In an exemplary system, divide by two divider 1650 triggers on a falling edge such as falling edge 1655.

FIG. 17B is a timing diagram showing a typical in-phase (I) signal 1656 in a preferred embodiment magnetic antenna transmission system 1600. In-phase (I) signal 1656 toggles at frequency f.

FIG. 17C is a timing diagram showing a typical quadrature (Q) signal 1657 in a preferred embodiment magnetic antenna transmission system 1600. Quadrature (Q) signal 1657 toggles at frequency f and is shifted in time by a quarter period with respect to in-phase (I) signal 1656.

FIG. 18 is a block diagram showing a first alternate embodiment magnetic antenna transmission system 1800 for use in a positioning system. First alternate embodiment magnetic antenna transmission system 1800 comprises oscillator 1849, quadrature splitter 1858, first power amplifier 1852, second power amplifier 1853, first magnetic antenna 1804, and second magnetic antenna 1808. In a preferred embodiment, first magnetic antenna 1804, and second magnetic antenna 1808 are arranged orthogonally. Transmitter system 1848 comprises oscillator 1849, quadrature splitter 1858, first power amplifier 1852, and second power amplifier 1853. Transmitter system 1848 is an example of an RF module, such as RF module 412.

Oscillator 1849 generates a sine wave signal at a frequency f and conveys a sine wave signal to a quadrature splitter 1858. Quadrature splitter 1858 yields a first in-phase signal I and a second quadrature signal Q. First power amplifier 1852 amplifies a first in-phase signal I and delivers a first in-phase signal I to first magnetic antenna 1804. Second power amplifier 1853 amplifies a second quadrature signal Q and delivers a second quadrature signal Q to second magnetic antenna 1808. Feeding a first in-phase signal I to first magnetic antenna 1804 and a second quadrature signal Q to second magnetic antenna 1808 enables a first alternate embodiment magnetic antenna transmission system 1800 to radiate substantially omnidirectional vertically polarized electromagnetic waves.

The main advantage of first alternate embodiment magnetic antenna transmission system 1800 is that it does not require any operation at frequencies higher than a preferred frequency f. This makes first alternate embodiment magnetic antenna transmission system 1800 suitable for use at higher frequencies, such as 13.56 MHz, where it becomes more difficult to implement the digital approach of preferred embodiment magnetic antenna transmission system 1600.

FIG. 19 is a block diagram showing a second alternate embodiment magnetic antenna transmission system 1900 for use in a positioning system. Second alternate embodiment magnetic antenna transmission system 1900 comprises oscillator 1949, switch 1959, first power amplifier 1952, second power amplifier 1953, first magnetic antenna 1904, and second magnetic antenna 1908. Transmitter system 1948 comprises oscillator 1949, switch 1959, first power amplifier 1952, and second power amplifier 1953. Transmitter system 1948 is an example of an RF module, such as RF module 412.

Switch 1959 toggles back and forth on a time scale short with respect to a receiver average response time scale. In a preferred embodiment, first magnetic antenna 1904, and second magnetic antenna 1908 are arranged orthogonally. Thus, second alternate embodiment magnetic antenna transmission system 1900 can achieve an effective omnidirectional vertical polarization radiation pattern. Thus, second alternate embodiment magnetic antenna transmission system 1900 radiates effectively omnidirectional vertically polarized electromagnetic waves. In an alternate embodiment, switch 1959 may switch at another predetermined rate or pattern, such as a rate longer than the receiver average response time scale.

Thus the two magnetic antennas may be used to transmit the equivalent of an omnidirectional pattern by driving the antennas in an orthogonal manner. The orthogonal drive may be, for example, time orthogonal as shown in the switched antenna examples, or phase orthogonal as shown in the phase quadrature examples. Other orthogonal switching patterns or signals may also be used. Since one objective of the orthogonal signaling is to provide coverage in the null of one antenna, strict orthogonality may not be necessary, an adequate component of orthogonality to overcome the deep null of one antenna may be sufficient.

Orthogonal drive may be in addition to the orthogonal arrangement of the null patterns of the two antennas. As with the drive, strict orthogonality of the antenna null patterns may not be necessary for all applications. Packaging constraints or other considerations may dictate a less than perfect implementation. Thus, in a further embodiment, the null axes are arranged with a 60 degree separation. In a further embodiment, three antennas may be arranged with nulls at 0, 60 and 120 degrees and driven with time orthogonal signals, or with three phase signals substantially at 0, 120 and 240 degree phase angles. Additional arrays of multiple antennas may be extrapolated from this teaching.

Figure 20:
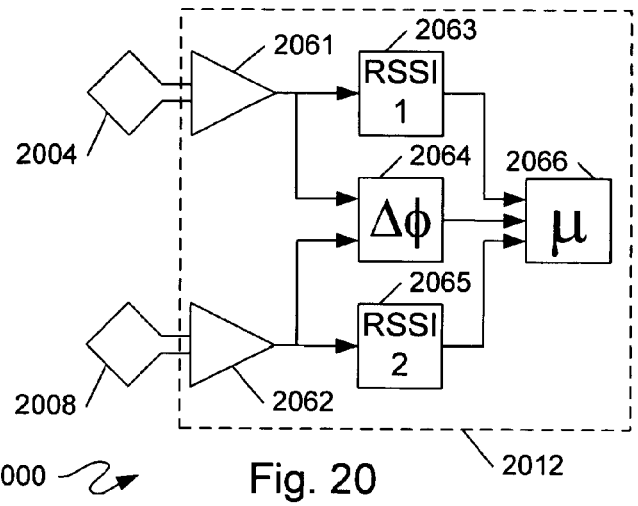
FIG. 20 is a block diagram showing a preferred embodiment magnetic antenna reception system for use in a positioning system.

FIG. 20 is a block diagram showing a preferred embodiment magnetic antenna reception system 2000 for use in a positioning system. Magnetic antenna reception system 2000 comprises first magnetic antenna 2004, second magnetic antenna 2008, first receiver 2061, second receiver 2062, first signal strength detector 2063, second signal strength detector 2065, microprocessor 2066, and in some embodiments, phase comparator 2064. In a preferred embodiment, first magnetic antenna 2004, and second magnetic antenna 2008 are arranged orthogonally. Receiver system 2012 comprises first receiver 2061, second receiver 2062, first signal strength detector 2063, second signal strength detector 2065, and in some embodiments, phase comparator 2064. Receiver system 2012 is an example of an RF module, such as RF module 412.

The microprocessor 2066 typically determines a received power by combining received power information from the first magnetic antenna 2004 and the second magnetic antenna 2008. In one embodiment, the power levels detected in the two antennas 2004, 2008 are summed. In another embodiment, the ratio of the power levels is used to determine a power multiplier factor based on the antenna receive patterns. The power multiplier is then applied to the greater power of the two to determine actual received power.

Figure 21:
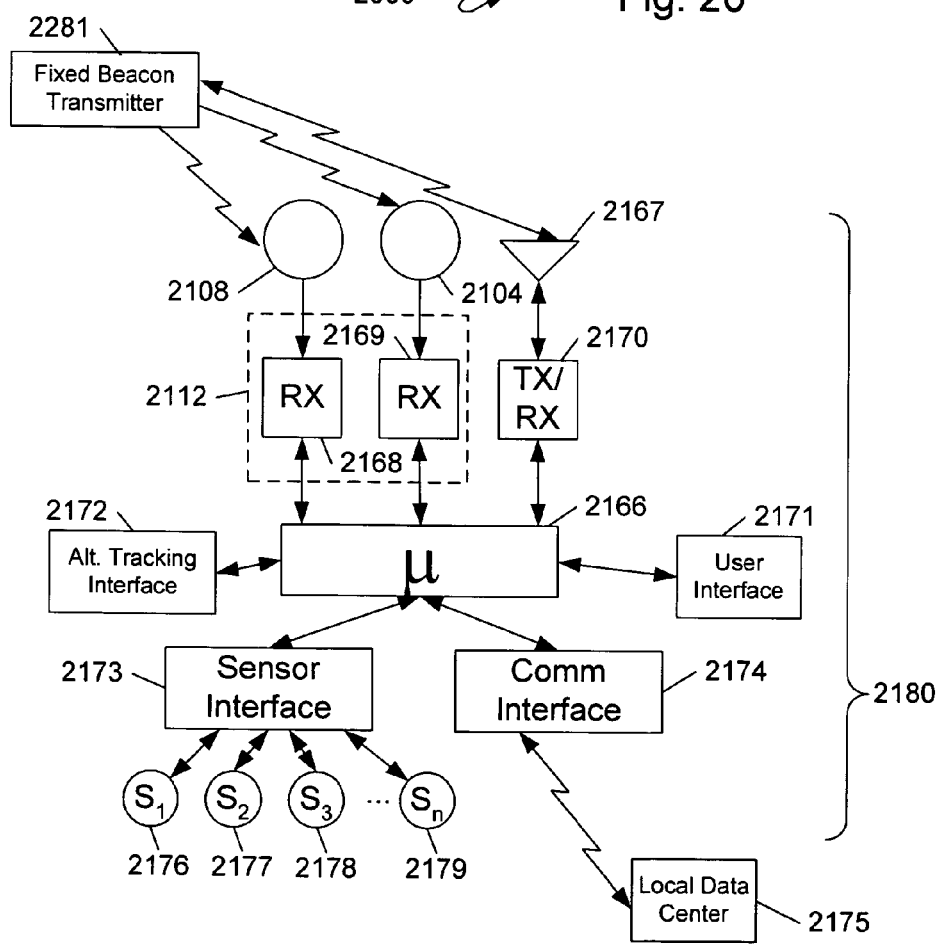
FIG. 21 is a block diagram showing a mobile locator tag for use in a positioning system.

FIG. 21 is a block diagram showing a mobile locator tag 2180 for use in a positioning system. Mobile locator tag 2180 comprises first magnetic antenna 2104, second magnetic antenna 2108, RF module 2112, electric antenna 2167, transceiver 2170, microprocessor 2166, alternate tracking interface 2172, user interface 2171, sensor interface 2173, first sensor 2176, second sensor 2177, third sensor 2178, nth sensor 2179, and communications interface 2174. The sensors 2173, 2176, 2177, and 2179 may be collectively referred to as a sensor net. Mobile locator tag 2180 receives signals from fixed beacon transmitters like fixed beacon transmitter 2281 and communicates with a local data center 2175.

RF module 2112 is a near field receiver comprising a first receiver 2169 and a second receiver 2168. First receiver 2169 detects signals from a first magnetic antenna 2104, and second receiver 2168 detects signals from a second magnetic antenna 2108. In a preferred embodiment, first magnetic antenna 2104 and second magnetic antenna 2108 are arranged orthogonally. First receiver 2169 and second receiver 2168 may use analog or digital techniques for determining signal properties such as RSSI. For instance, first receiver 2169 and second receiver 2168 may perform a Fourier Transform operation like an FFT on a received time domain waveform to simultaneously identify amplitude and phase characteristics of multiple near field signals at various frequencies. RF module 2112 communicates signal characteristics to microprocessor 2166. Microprocessor 2166 conveys command and control signals to RF module 2112.

Near field transceiver 2170 receives signals from electric field antenna 2167. Electric field antenna detects electric field signals from fixed beacon transmitter 2281. In alternate embodiments, near field transceiver 2170 can also transmit data signals to fixed beacon transmitter 2281 intermediate electric field antenna 2167. Microprocessor 2166 conveys command and control signals as well as data signals to near field transceiver 2170.

An optional alternate tracking interface 2172 conveys data intermediate a microprocessor and an alternate tracking system. For instance, a short range high precision tracking system such as a UWB, IR, acoustic, or short range near field electromagnetic positioning system may be employed to perform supplemental or ancillary positioning and tracking of other mobile-locator receivers in the immediate vicinity. Microprocessor 2166 conveys command and control signals to alternate tracking interface 2172 and receives data pertaining to location and position.

A particularly useful alternate tracking system is a near field amplitude positioning system operating at frequencies in the vicinity of 13.56 MHz with a wavelength ($\lambda$=22 m). Such a frequency is suitable for precision near field amplitude positioning to a range of 3-10 m. A near field amplitude positioning system at 13.56 MHz is particularly well suited for monitoring people within a small unit, or squad. A near field amplitude positioning system operating at frequencies in the vicinity of 13.56 MHz is also suitable as a stand-alone system for monitoring social interactions and contacts between people in a residential or office environment. In such an application, a mobile transmitter tag co-located with a mobile locator receiver tag facilitates mutual ranging and positioning.

Optional user interface 2171 provides means to control mobile locator tag 2180 and obtain information from mobile locator tag 2180. User interface 2171 conveys command and control signals to microprocessor 2166 and provides means for accessing information stored in microprocessor 2166. Optional user interface 2171 may employ visual, audio or tactile means of conveying data to a user. Optional user interface 2171 may further comprise means for a user to control a mobile locator tag or otherwise input relevant data to a microprocessor.

Microprocessor 2166 includes input/output capability, memory and/or data storage capability, and processing capability. Preferentially, microprocessor 2166 also includes the ability to monitor data from sensor interface 2173, apply rules, and react to data from sensor interface 2173. Microprocessor 2166 can convey data, alarms, alerts, or status information via communications interface 2174 to a local data center 2175. In some embodiments, microprocessor 2166 can store and allow retrieval of other information including for instance invoices, bills of lading, material safety data, and sensor logs.

Sensor interface 2173 may exchange control and data signals with the sensor net. Sensor interface 2173 may include wired or wireless links to the sensor net. Sensor interface 2173 is preferentially compatible with IEEE 1451.2 or similar such protocols for data exchange. Preferentially, sensor interface 2173 enables a modular approach to sensor net 2173 in which a wide variety of sensors may be selected to fulfill a variety of desired missions, including container security, container surveillance, container integrity, and container safety.

Sensor interface 2173 may connect to a variety of sensors. For purposes of illustration and not limitation, first sensor 2176 might detect heart rate, body temperature, respiration or other vital statistic of an individual associated with mobile locator tag 2180. Alternatively, first sensor 2176 might detect oxygen tank level, battery status, or ammunition level status of an individual associated with mobile locator tag 2180. Second sensor 2177 might detect motion and thus be able to determine when mobile locator tag 2180 moves and should transmit an update. Such a motion detector might be part of a more comprehensive inertial tracking system that could provide valuable information to contribute toward an accurate position solution. Third sensor 2178 might detect temperature, humidity, the presence of dangerous chemical or biological agents or the presence of ionizing radiation that might indicate environmental hazards dangerous for the person or asset associated with mobile locator tag 2180. As many additional sensors as might be desired may be added, up to and including an $n^{th}$ sensor 2179 that might detect tampering or the presence of undesired activity in the vicinity of a valuable asset. In the context of a positioning system for assets, sensor interface 2173 enables asset integrity and security to be preserved and also allows early detection of potential hazards or other anomalies. In the context of a positioning system for people or animals, sensor interface 2173 enables health and safety to be monitored and provides for prompt detection of potentially hazardous or dangerous situations. Discussions of specific sensors are for purposes of illustration not limitation.

Local data center 2175 (LDC) receives and processes data from mobile locator receiver tags like mobile receiver locator tag 2180. This data may include signal strength (RSSI) or other signal characteristics including phase characteristics. Local data center 2175 can use data from a mobile locator tag 2180 to determine position of a mobile locator tag 2180 using a ranging algorithm with plurality of appropriate ranging parameters for a given propagation environment as selected by a user or other schemes. Alternatively a mobile-locator tag 2180 may perform certain processing locally and convey ranges or a calculated position to a local data center 2175.

Nothing in this description should be interpreted so as to require all elements depicted in FIG. 21. For instance in alternate embodiments, mobile locator receiver tag 2180 may omit alternate tracking interface 2172, user interface 2171, sensor interface 2173, first sensor 2176, second sensor 2177, third sensor 2178, nth sensor 2179, or communications interface 2174. Mobile locator receiver tag 2180 requires only those elements needed for a particular application.

Figure 22:
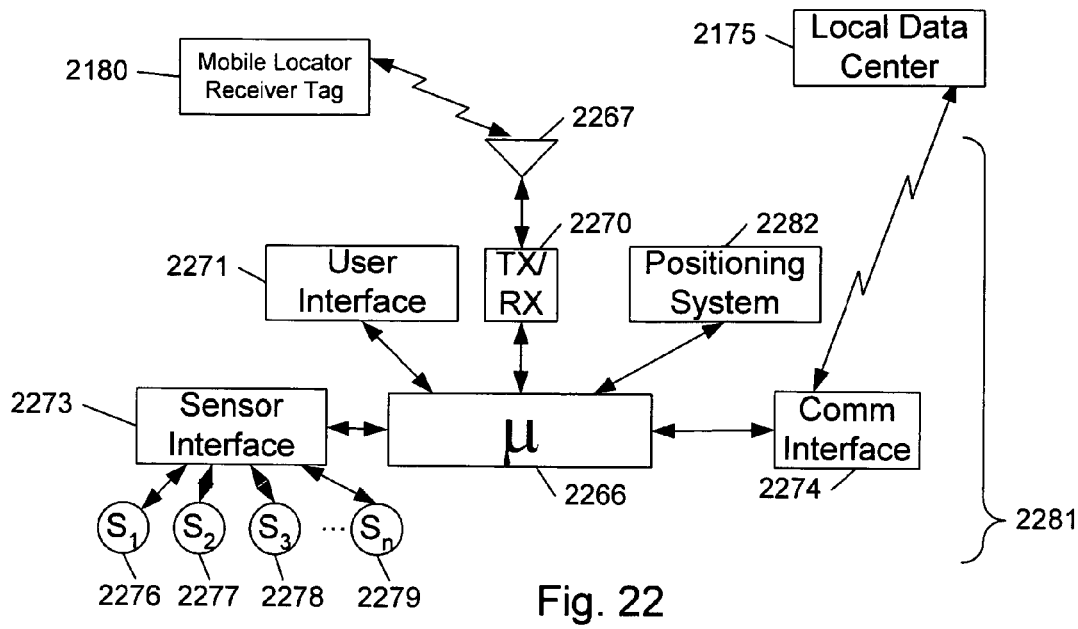
FIG. 22 is a block diagram presenting a fixed beacon transmitter for use in a positioning system.

FIG. 22 is a block diagram presenting a fixed beacon transmitter 2281 for use in a positioning system. Fixed beacon transmitter 2281 comprises electric field antenna 2267, near field transceiver 2270, user interface 2271, positioning system 2282, microprocessor 2266, sensor interface 2273, first sensor 2276, second sensor 2277, third sensor 2278, nth sensor 2279, and communications interface 2274. Fixed beacon transmitter 2281 transmits signals to mobile locator receiver tags (like mobile receiver tag 2180). Fixed beacon transmitter 2281 communicates with a local data center 2175.

Near field transceiver 2270 transmits a signal via electric field antenna 2267 to mobile locator receiver tags, like mobile locator receiver tag 2180. In alternate embodiments, near field transceiver 2270 can also receive data signals from mobile locator receiver tags, like mobile locator receiver tag 2180, intermediate electric field antenna 2267. Microprocessor 2266 conveys command and control signals as well as potentially receives data signals from near field transceiver 2270.

In alternate embodiments, a near field transceiver 2270 may include means for transmitting and receiving near field signals through a propagation environment to other beacon transmitter devices 2270 at known locations so as to measure appropriate ranging parameters for use in a ranging algorithm.

An optional positioning system 2282 may include use of pre-surveyed landmarks, GPS, UWB, laser range finding, or near field electromagnetic ranging to establish location of a fixed beacon transmitter. Microprocessor 2166 conveys command and control signals to optional positioning system 2282 and receives data pertaining to location and position.

Optional user interface 2271 provides means to control fixed beacon transmitter 2281 and obtain information from fixed beacon transmitter 2281. User interface 2271 conveys command and control signals to microprocessor 2266 and provides means for accessing information stored in microprocessor 2266. Optional user interface 2271 may employ visual, audio or tactile means of conveying data to a user. Optional user interface 2271 may further comprise means for a user to control a fixed beacon transmitter 2281 or otherwise input relevant data to a microprocessor 2266.

Microprocessor 2266 includes input/output capability, memory and/or data storage capability, and processing capability. Preferentially, microprocessor 2266 also includes the ability to monitor data from sensor interface 2273, apply rules, and react to data from sensor interface 2273. Microprocessor 2266 can convey data, alarms, alerts, or status information via communications interface 2274 to a local data center 2175. Microprocessor 2266 can store and allow retrieval of other information including for instance invoices, bills of lading, material safety data, and sensor logs.

Sensor interface 2273 exchanges control and data signals intermediate sensors (such as sensor 2276) and a microprocessor 2266. Sensor interface 2273 may include wired or wireless links to a sensor net (not shown). Sensor interface 2273 is preferentially compatible with IEEE 1451.2 or similar such protocols for data exchange. Preferentially, sensor interface 2273 enables a modular approach to the sensor net in which a wide variety of sensors may be selected to fulfill a variety of desired missions.

The sensor net may connect to a variety of sensors. For purposes of illustration and not limitation, first sensor 2276 might detect heart rate, body temperature, respiration or other vital statistic of an individual associated with mobile locator tag 2280. Alternatively, first sensor 2276 might detect oxygen tank level, battery status, or ammunition level status of an individual associated with mobile locator tag 2280. Second sensor 2277 might detect motion and thus be able to determine when mobile locator tag 2280 moves and should transmit an update. Such a motion detector might be part of a more comprehensive inertial tracking system that could provide valuable information to contribute toward an accurate position solution. Third sensor 2278 might detect temperature, humidity, the presence of dangerous chemical or biological agents or the presence of ionizing radiation that might indicate environmental hazards dangerous for the person or asset associated with mobile locator tag 2280. As many additional sensors as might be desired may be added, up to and including an $n^{th}$ sensor 2279 that might detect tampering or the presence of undesired activity in the vicinity of a valuable asset. In the context of a positioning system for assets, sensor interface 2273 enables asset integrity and security to be preserved and also allows early detection of potential hazards or other anomalies. In the context of a positioning system for people or animals, sensor interface 2273 enables health and safety to be monitored and provides for prompt detection of potentially hazardous or dangerous situations. Discussions of specific sensors are for purposes of illustration not limitation.

Local data center 2175 (LDC) receives and processes data from fixed beacon transmitters like fixed beacon transmitter 2281. Local data center 2175 may also convey command and control signals to fixed beacon transmitter 2281.

Nothing in this description should be interpreted so as to require all elements depicted in FIG. 22. For instance in alternate embodiments, fixed beacon transmitter 2281 may omit positioning system 2282, sensor interface 2273, first sensor 2276, second sensor 2277, third sensor 2278, nth sensor 2279, or communications interface 2174. Fixed beacon transmitter 2281 requires only those elements needed for a particular application.

Figure 23:
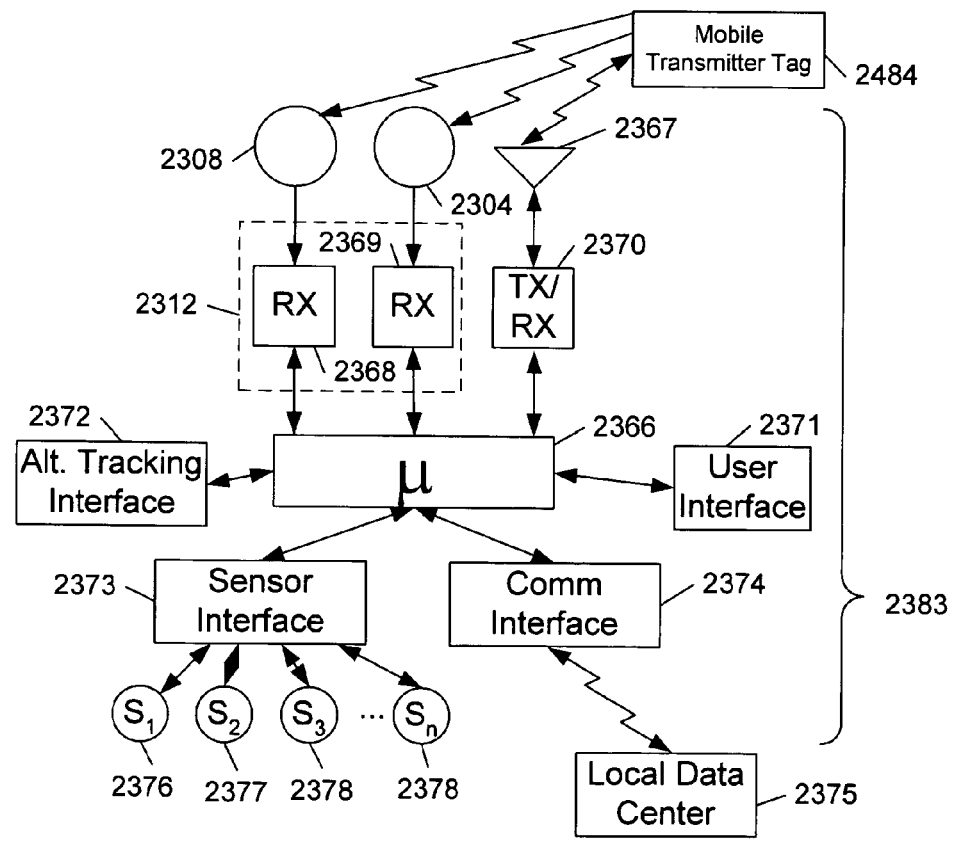
FIG. 23 is a block diagram describing a fixed locator receiver for use in a positioning system.

FIG. 23 is a block diagram describing a fixed locator receiver 2383 for use in a positioning system. Fixed locator receiver 2383 comprises first magnetic antenna 2304, second magnetic antenna 2308, RF module 2312, electric antenna 2367, transceiver 2370, microprocessor 2366, alternate tracking interface 2372, user interface 2371, sensor interface 2373, first sensor 2376, second sensor 2377, third sensor 2378, nth sensor 2379, and communications interface 2374. Mobile locator tag 2383 receives signals from mobile transmitter tags like mobile transmitter tag 2484 and communicates with a local data center 2375.

RF module 2312 is a near field receiver comprising first receiver 2369 and second receiver 2368. First receiver 2369 detects signals from first magnetic antenna 2304, and second receiver 2368 detects signals from second magnetic antenna 2308. In a preferred embodiment, first magnetic antenna 2304 and second magnetic antenna 2308 are arranged orthogonally. First receiver 2369 and second receiver 2368 may use analog or digital techniques for determining signal properties such as signal strength (RSSI). For instance, first receiver 2369 and second receiver 2368 may perform a Fourier Transform operation like an FFT on a received time domain waveform to simultaneously identify amplitude and phase characteristics of multiple near field signals at various frequencies. RF module 2312 communicates signal characteristics to microprocessor 2366. Microprocessor 2366 conveys command and control signals to RF module 2312.

Near field transceiver 2370 receives signals from electric field antenna 2367. Electric field antenna 2367 detects electric field signals from mobile transmitter tag 2484. In alternate embodiments, near field transceiver 2370 can also transmit data signals to mobile transmitter tag 2484 intermediate electric field antenna 2367. Microprocessor 2366 conveys command and control signals as well as data signals to near field transceiver 2370.

An optional alternate tracking interface 2372 conveys data intermediate a microprocessor and an alternate tracking system. For instance, a short range high precision tracking system such as a UWB, IR, acoustic, or short range near field electromagnetic positioning system may be employed to perform supplemental or ancillary positioning and tracking of other mobile-locator receivers in the immediate vicinity. Microprocessor 2366 conveys command and control signals to alternate tracking interface 2372 and receives data pertaining to location and position.

Optional user interface 2371 provides means to control fixed locator receiver 2383 and obtain information from fixed locator receiver 2383. User interface 2371 conveys command and control signals to microprocessor 2366 and provides means for accessing information stored in microprocessor 2366. Optional user interface 2371 may employ visual, audio or tactile means of conveying data to a user. Optional user interface 2371 may further comprise means for a user to control a fixed locator receiver 2383 or otherwise input relevant data to a microprocessor 2266.

Microprocessor 2366 includes input/output capability, memory and/or data storage capability, and processing capability. Preferentially, microprocessor 2366 also includes the ability to monitor data from sensor interface 2373, apply rules, and react to data from sensor interface 2373. Microprocessor 2366 can convey data, alarms, alerts, or status information via communications interface 2374 to a local data center 2375. Microprocessor 2366 can store and allow retrieval of other information including for instance invoices, bills of lading, material safety data, and sensor logs.

Sensor interface 2373 exchanges control and data signals intermediate a sensor (like sensor 2376) and a microprocessor 2366. Sensor interface 2373 may include wired or wireless links to a sensor net (not shown). Sensor interface 2373 is preferentially compatible with IEEE 1451.2 or similar such protocols for data exchange. Preferentially, sensor interface 2373 enables a modular approach to sensor net 2373 in which a wide variety of sensors may be selected to fulfill a variety of desired missions.

Local data center 2375 receives and processes data from fixed locator receivers like fixed locator receiver 2383. This data may include signal strength (RSSI) or other signal characteristics including phase characteristics. Local data center 2375 can use data from fixed locator receiver 2383 to determine position of a mobile transmitter tag 2484 using a ranging algorithm with plurality of appropriate ranging parameters for a given propagation environment as selected by a user or other schemes. Alternatively a fixed locator receiver 2383 may perform certain processing locally and convey ranges or a calculated position to a local data center 2375.

Nothing in this description should be interpreted so as to require all elements depicted in FIG. 23. For instance in alternate embodiments, fixed locator receiver 2383 may omit alternate tracking interface 2372, user interface 2371, sensor interface 2373, first sensor 2376, second sensor 2377, third sensor 2378, nth sensor 2379, or communications interface 2374. Mobile locator receiver tag 2380 requires only those elements needed for a particular application.

Figure 24:
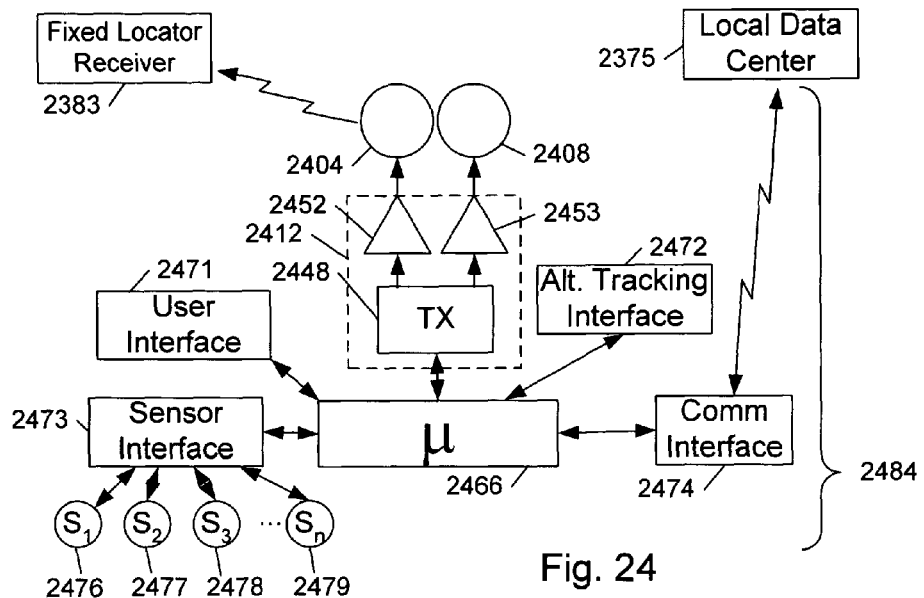
FIG. 24 is a block diagram laying out a mobile transmitter tag for use in a positioning system.

FIG. 24 is a block diagram laying out a mobile transmitter tag 2484 for use in a positioning system. Mobile transmitter tag 2484 comprises first magnetic field antenna 2404, second magnetic field antenna 2408, RF module 2412, user interface 2471, alternate tracking interface 2472, microprocessor 2466, sensor interface 2473, first sensor 2476, second sensor 2477, third sensor 2478, nth sensor 2479, and communications interface 2474. Mobile transmitter tag 2484 transmits signals to fixed locator receivers (like fixed locator receiver 2383). Mobile transmitter tag 2484 also communicates with a local data center 2375.

RF module 2412 comprises transmitter 2448, first power amplifier 2452, and second power amplifier 2453. Preferred embodiment magnetic antenna transmission system 1600, first alternate embodiment magnetic antenna transmission system 1800, and second alternate embodiment magnetic antenna transmission system 1900 are potential implementations of RF module 2412. RF module 2412 conveys signals to first magnetic antenna 1804, and second magnetic antenna 1808. In a preferred embodiment, first magnetic antenna 1804, and second magnetic antenna 1808 are arranged orthogonally.

An optional alternate tracking interface 2472 conveys data intermediate a microprocessor and an alternate tracking system. For instance, a short range high precision tracking system such as a UWB, IR, acoustic, or short range near field electromagnetic positioning system may be employed to perform supplemental or ancillary positioning and tracking of other mobile-locator receivers in the immediate vicinity. Microprocessor 2466 conveys command and control signals to alternate tracking interface 2472 and receives data pertaining to location and position.

Microprocessor 2466 includes input/output capability, memory and/or data storage capability, and processing capability. Preferentially, microprocessor 2466 also includes the ability to monitor data from sensor interface 2473, apply rules, and react to data from sensor interface 2473. Microprocessor 2466 can convey data, alarms, alerts, or status information via communications interface 2474 to a local data center 2375. Microprocessor 2466 can store and allow retrieval of other information including for instance invoices, bills of lading, material safety data, and sensor logs.

Sensor interface 2473 exchanges control and data signals intermediate sensor (such as sensor 2476) and a microprocessor 2466. Sensor interface 2473 may include wired or wireless links to sensor net. Sensor interface 2473 is preferentially compatible with IEEE 1451.2 or similar such protocols for data exchange. Preferentially, sensor interface 2473 enables a modular approach to sensor net 2473 in which a wide variety of sensors may be selected to fulfill a variety of desired missions.

Sensor interface 2473 may connect to a variety of sensors. For purposes of illustration and not limitation, first sensor 2476 might detect heart rate, body temperature, respiration or other vital statistic of an individual associated with mobile transmitter tag 2484. Alternatively, first sensor 2476 might detect oxygen tank level, battery status, or ammunition level status of an individual associated with mobile transmitter tag 2484. Second sensor 2477 might detect motion and thus be able to determine when mobile transmitter tag 2484 moves and should transmit an update. Such a motion detector might be part of a more comprehensive inertial tracking system that could provide valuable information to contribute toward an accurate position solution. Third sensor 2478 might detect temperature, humidity, the presence of dangerous chemical or biological agents or the presence of ionizing radiation that might indicate environmental hazards dangerous for the person or asset associated with mobile transmitter tag 2484. As many additional sensors as might be desired may be added, up to and including an $n^{th}$ sensor 2479 that might detect tampering or the presence of undesired activity in the vicinity of a valuable asset. In the context of a positioning system for assets, sensor interface 2473 enables asset integrity and security to be preserved and also allows early detection of potential hazards or other anomalies. In the context of a positioning system for people or animals, sensor interface 2473 enables health and safety to be monitored and provides for prompt detection of potentially hazardous or dangerous situations. Discussions of specific sensors are for purposes of illustration not limitation.

Optional user interface 2471 provides means to control mobile transmitter tag 2484 and obtain information from mobile transmitter tag 2484. User interface 2471 conveys command and control signals to microprocessor 2366 and provides means for accessing information stored in microprocessor 2366. Optional user interface 2471 may employ visual, audio or tactile means of conveying data to a user. Optional user interface 2471 may further comprise means for a user to control a mobile transmitter tag 2484 or otherwise input relevant data to a microprocessor 2266.

Local data center 2375 optionally receives and processes data from mobile transmitter tags like mobile transmitter tag 2484. Local data center 2375 may also convey command and control signals to mobile transmitter tag 2484.

Nothing in this description should be interpreted so as to require all elements depicted in FIG. 24. For instance in alternate embodiments, mobile transmitter tag 2484 may omit user interface 2471, alternate tracking interface 2472, sensor interface 2473, first sensor 2476, second sensor 2477, third sensor 2478, nth sensor 2479, and communications interface 2474. Mobile transmitter tag 2484 requires only those elements needed for a particular application.

Note that the magnetic antennas discussed with reference to FIGS. 16-24 and as generally discussed in this disclosure may be a magnetic antenna of any appropriate design. In particular, the magnetic antennas of FIGS. 4-8 are well adapted for the applications of FIGS. 16-20.

Figure 25:
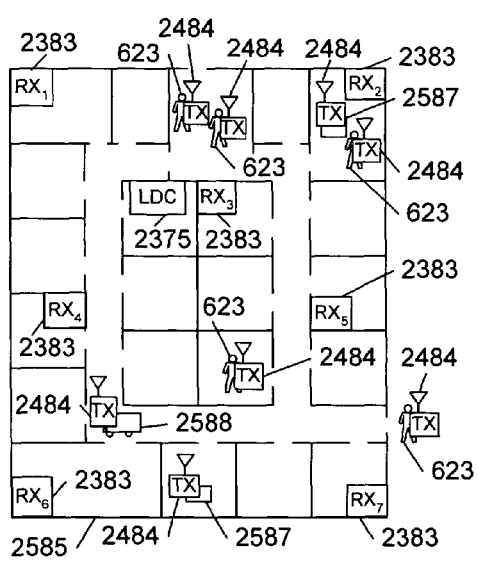
FIG. 25 illustrates an exemplary indoor deployment of a positioning system including fixed locator receivers and mobile transmitter tags.

FIG. 25 illustrates an exemplary indoor deployment of a positioning system including fixed locator receivers and mobile transmitter tags. A plurality of mobile beacon transmitters 2484 are attached to people 623, fixed assets 2587, mobile assets 2588 or other objects whose position is desired to be known. Fixed locator receivers 2383 are placed at various known positions within a building 2585.

In accordance with the present invention, ranging may be determined using free space equations as illustrated in FIG. 3. The equations may be adjusted for ground plane effects and potentially for imperfect ground plane conductivity. In a further embodiment, complex structures, such as buildings, urban areas, wooded areas, or even specific building types such as wood frame, concrete block, steel stud or other typical building types may be evaluated through empirical experiment to determine typical attenuation or phase shift characteristics. The characteristics may be evaluated over a range of buildings of the same type to establish an average characteristic. The average characteristics may be expressed in the form of standardized equations or standardized algorithm so that only a few parameters, such as an exponential decay rate need be specified to establish a range model for a particular situation.

In another embodiment, a particular locale may be mapped by using transmitters and receivers at predetermined locations by transmitting and receiving at a large number of locations within the locale. The map may then be stored in a database. In use, readings of signal characteristics are taken and compared with the database map to determine by lookup and/or interpolation, the precise location indicated by the signal readings. Further details of signal mapping techniques are disclosed in U.S. patent application Ser. No. 10/958,165, titled "Near field electromagnetic positioning system and method," filed Oct. 4, 2004 by Schantz et al and published as Pub. No. 2005/0046608 A1, which is incorporated herein by reference in its entirety.

A local data center (LDC) 2375 receives and processes data from mobile beacon transmitters 2484 and fixed locator receivers 2383. This data may include RSSI's or other signal characteristics including phase characteristics. A local data center (LDC) 2375 can use data from a fixed locator receiver 2383 to determine position of a mobile beacon transmitter 2484 using a ranging algorithm with plurality of appropriate ranging parameters for a given propagation environment as selected by a user. Alternatively a fixed locator receiver 2383 may perform range and/or position processing locally and convey ranges or a calculated position to a local data center (LDC) 2375.

Figure 26:
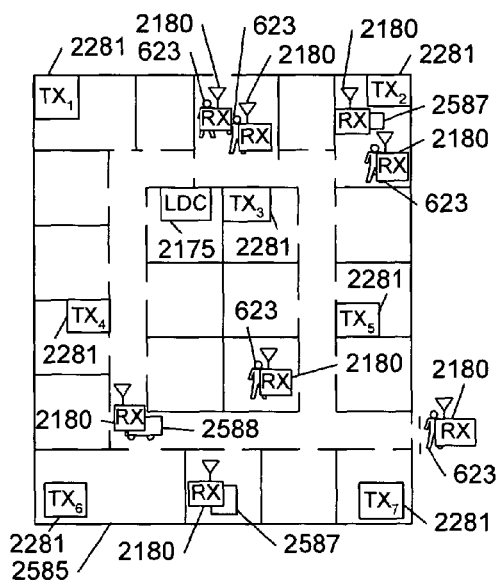
FIG. 26 illustrates an exemplary indoor deployment of a positioning system including fixed beacon transmitters and mobile locator receiver tags.

FIG. 26 illustrates an exemplary indoor deployment of a positioning system including fixed beacon transmitters and mobile locator receiver tags. Mobile locator receivers 2180 are attached to people 623, valuable assets 2587, mobile assets 2588 or other objects whose position is desired to be known. Fixed beacon transmitters 2281 are placed at various known positions within a building 2585. A local data center (LDC) 2175 receives data regarding signal characteristics or ranges from mobile locator receivers 2180. In one embodiment, the local data center 2175 calculates ranges based on signal characteristic data as received by the mobile locator receivers 2180. In an alternate embodiment, the mobile locator receivers 2180 perform range calculation and pass range information to the local data center 2175.

Figure 27:
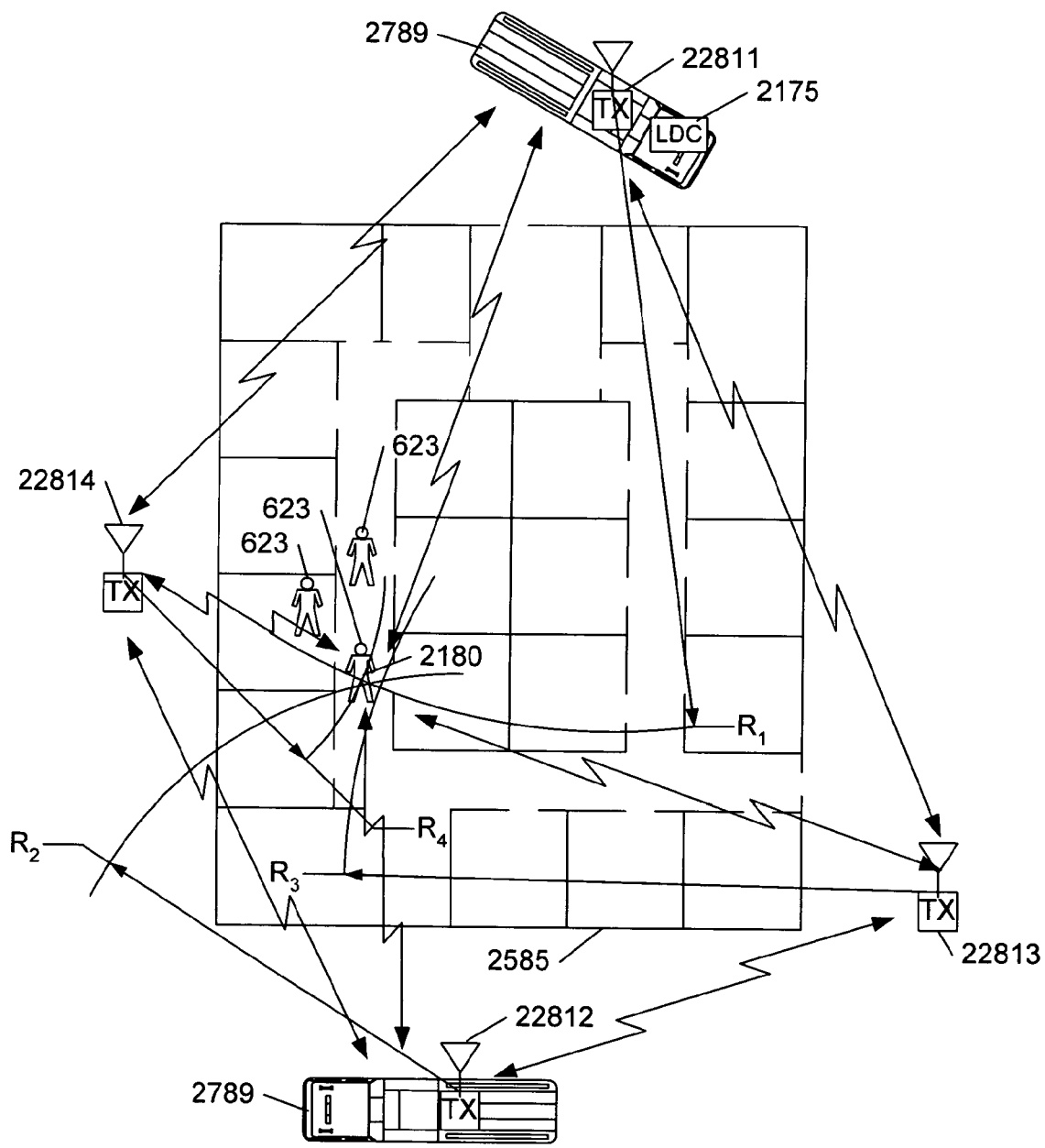
FIG. 27 illustrates an exemplary positioning system including fixed beacon transmitters and mobile locator receiver tags at an incident scene.

FIG. 27 illustrates an exemplary positioning system including fixed beacon transmitters and mobile locator receiver tags at an incident scene as may be used by the military or emergency responders.

The incident scene is a building, facility, or other environment requiring an emergency response from emergency responders like police, fire, paramedic, rescue, hazardous material, military, or other such individuals. Users deploy beacon transmitters 22811 through 22814 around or throughout an incident scene.

Users also select a plurality of appropriate ranging parameters for a propagation algorithm based on the nature of the incident scene. For instance, if the incident scene is a multi-resident dwelling, users may select a plurality of appropriate ranging parameters for a multi-resident dwelling. If the incident scene is a warehouse, users may select a plurality of appropriate ranging parameters for a warehouse. If the incident scene is an office building, users may select a plurality of appropriate ranging parameters for an office building. Users may be provided with a menu of options to allow them to select a plurality of optimal ranging parameters for a propagation algorithm. A plurality of ranging parameters may include but is not necessarily limited to a slope and intercept for a linear range vs. RSSI relationship.

FIG. 27 shows four beacon transmitters 22811 through 22814 for purposes of illustration. Additional beacon transmitters may yield a larger zone of coverage and/or a more accurate solution. Fewer beacon transmitters may yield a less accurate but still potentially useful position solution. Beacon transmitters 22811 through 22814 may be stand alone units or mounted on vehicles 2789. Beacon transmitters 22811 through 22814 may employ an alternate positioning system 2282 like pre-surveyed landmarks, GPS, UWB, laser range finding, or near field electromagnetic ranging to establish their locations via alternate positioning system. Beacon transmitters 22811 through 22814 may also include a transceiver capability to convey data intermediate mobile locator receiver tags 2180 and a local data center (LDC) 2175.

Preferably the beacon transmitters 22811 through 22814 should emit a near field signal of constant power. Regulated transmit power control means can help ensure a constant transmit power. Power level may alternatively be adjusted to maintain constant received power in response to variations in path attenuation, which may include variations in orientation of mobile units.

Alternatively, received power RSSI measurements may be adjusted to compensate for variations in transmitted power, which may vary as a function of battery levels and other factors.

The operation of one embodiment of the system will now be described in detail with reference to FIG. 27. The positions of the beacon transmitters 22811 through 22814 may be determined by survey or by GPS or by other methods that may be suitable for use outside the building but may not be suitable for use inside the building. When the positions of the beacon transmitters 22811 through 22814 are known, the system may commence operation. A mobile locator receiver tag 2180 receives a first signal from a first beacon transmitter 22811 and determines a first RSSI. The mobile locator receiver tag 2180 receives a second signal from a second beacon transmitter 22812 and determines a second RSSI. The mobile locator receiver tag 2180 receives a third signal from a third beacon transmitter 22813 and determines a third RSSI. The mobile locator receiver tag 2180 receives a fourth signal from a fourth beacon transmitter 22814 and determines a fourth RSSI. Using a plurality of ranging parameters suitable for the incident scene, the mobile locator receiver tag 2180 determines ranges (R1 through R4) to each respective beacon transmitter. Ranges R1 through R4 may be used by a mobile locator receiver tag 2180 to determine position using multi-lateration or other techniques. Alternatively, a mobile locator receiver tag 2180 may convey ranges R1 through R4 to a local data center 2175 where position may be determined.

The local data center 2175 receives and processes data from beacon transmitters 22811 through 22814 and mobile locator receiver tag 2180. This data includes RSSI's or other signal characteristics including phase characteristics. The local data center 2175 can use data from a mobile locator receiver tag 2180 to determine position of a mobile locator receiver tag 2180 using a ranging algorithm with plurality of appropriate ranging parameters for a given propagation environment as selected by a user. Alternatively the mobile-locator receiver tag 2180 may perform range and/or position calculation processing locally and convey ranges or calculated position to a local data center 2175.

In alternate embodiments, appropriate ranging parameters for a given propagation environment may be determined for a particular incident scene by a plurality of beacon transmitters 22811 through 22814 sending signals through the incident scene propagation environment to locator receivers 2180 at known positions (not shown), for instance, co-located with other beacon transmitters 22811 through 22814.

In a further alternate embodiment, where each beacon transmitter also includes receiver locator capability 2180 (not shown), the positions of the beacon transmitters may be determined by determining the set of ranges R1 through R4 between available Transceivers and determining position by triangulation from the set of ranges R1 through R4.

Figure 28:
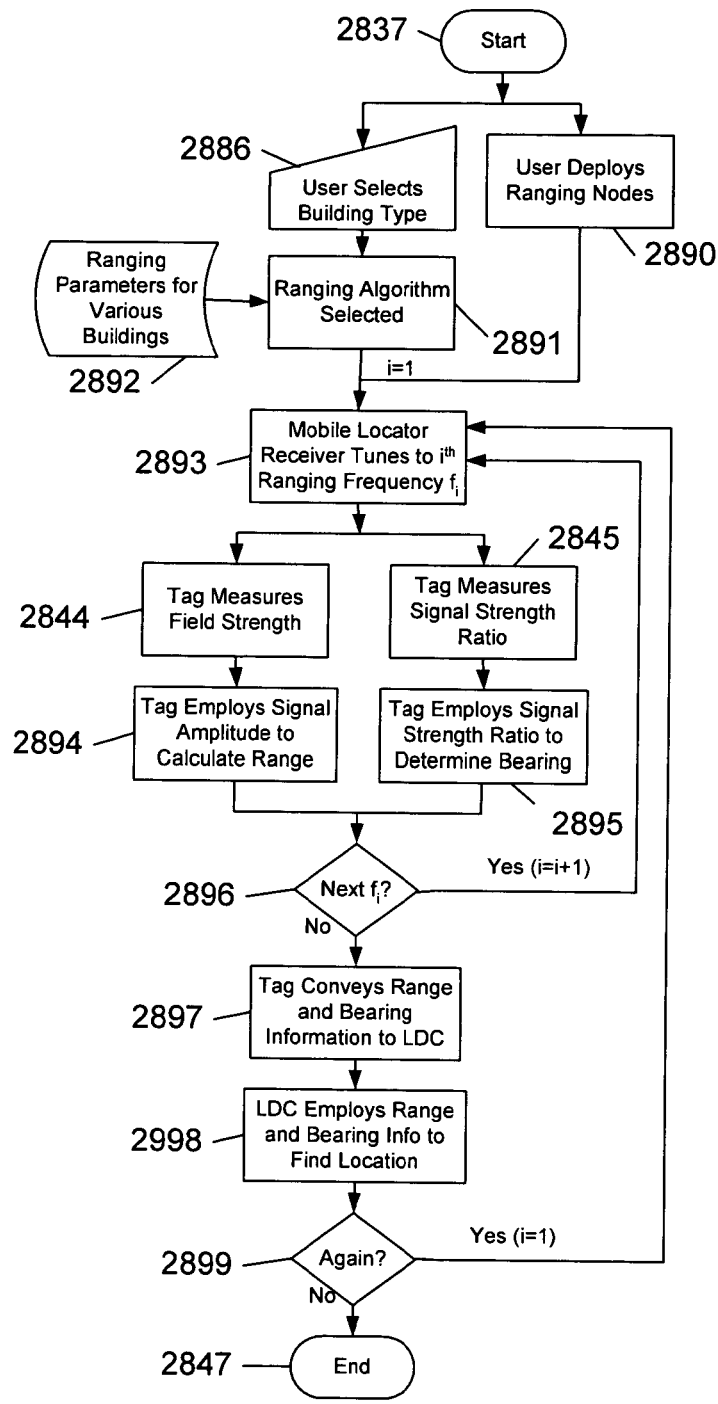
FIG. 28 is a process flow diagram of a positioning system including fixed beacon transmitters and mobile locator tags using near field signal strength.

FIG. 28 is a process flow diagram of a positioning system including fixed beacon transmitters and mobile locator tags using near field signal strength. The positioning system of FIG. 28 may be used for a variety of applications including but not limited to military or emergency responder applications. A preferred embodiment method for near field signal strength positioning begins at a start block 2837 and continues (with the following steps in no particular order) with a user deploying ranging nodes (as noted in block 2890) and a user selecting building type (as noted in block 2886). A user selecting building type effects a selection of appropriate ranging parameters 2892 for a ranging algorithm from stored ranging parameters 2892 for various buildings as shown in block 2891. Alternatively, a user selecting building type (as noted in block 2886) may select the ranging algorithm optimized for the particular building type, thus effected the process step denoted in block 2891. Ranging parameters 2892 may pertain to a particular class of structure or may be optimized to particular structures. The ranging parameters 2892 or the ranging algorithm selection (as noted in block 2891) may be conveyed to a mobile locator tag by using a data link. Alternatively, the ranging parameters 2892 or the ranging algorithm selection (as noted in block 2891) may be conveyed to a local data center (LDC) where a ranging calculation may be performed.

In alternate embodiments, appropriate ranging parameters 2892 for a given propagation environment may be determined for a particular incident scene by a plurality of beacon transmitters sending signals through the given propagation environment to locator receivers at known positions, for instance, co-located with other beacon transmitters.

The preferred embodiment method of FIG. 28 for near field signal strength positioning continues with a process block 2893 in which a mobile locator tag tunes to the $i^{th}$ ranging frequency beginning with i=1. The method continues with the following steps in no particular order with the mobile locator tag measuring signal strength from a beacon transmitter operating at the $i^{th}$ ranging frequency (as shown in block 2844)

and optionally with the mobile locator tag measuring other signal parameters such as signal strength ratio or phase properties of a signal from the beacon transmitter operating at the $i^{th}$ ranging frequency (as shown in block 2845). The mobile locator tag employs signal amplitude or RSSI to calculate range using the ranging algorithm selected in block 2891 (as shown in block 2894). The mobile locator tag further employs other signal characteristics such as signal strength ratio or phase properties of a signal to determine bearing or other position relevant information (as shown in block 2895).

The method of FIG. 28 continues with a decision block 2896 whether to go to the $(i+1)^{th}$ ranging frequency. If yes, the process continues with a mobile locator tag tuning to the $(i+1)^{th}$ ranging frequency as shown in block 2893. If no, the process continues with a mobile tag conveying range and other useful information, including but not limited to bearing, to a local data center (LDC) as shown in block 2897. A local data center may employ range and other useful information, including but not limited to bearing, to find location as denoted in block 2898. In alternate embodiments, a mobile locator tag may employ range and other useful information, including but not limited to bearing, to find location and convey location information to a local data center (LDC) or elsewhere by using a data link. In still other alternate embodiments, a mobile locator tag may convey signal amplitude or RSSI to a local data center (LDC) or elsewhere for a calculation of range using a ranging algorithm. A mobile locator tag may further convey other signal characteristics such as signal strength ratio or phase properties of a signal to a local data center (LDC) or elsewhere for a determination of bearing or other position relevant information.

A preferred embodiment method for near field signal strength positioning continues with a decision block 2899 assessing whether to continue tracking based on user inputs or other information. If yes, the process continues as shown in block 2993 by a mobile locator tag tuning to the $i^{th}$ ranging frequency beginning with i=1 and repeating. If no, the process terminates in an end block 2847.

Orthogonal Antenna Systems

This section presents an evaluation of the geometric orientation for which two small loops will have minimum coupling. We assume that the loops lie in each other's near field, so only inductive coupling is relevant. To solve the problem, the inventors invoke the principal of reciprocity between two electromagnetic systems, system "a" and system "b." By the principal of reciprocity:

$$\iint\limits_V \int [E_b \cdot J_a - H_a \cdot M_b] dV = \iint\limits_V \int [E_a \cdot J_b - H_b \cdot M_a] dV \quad (1)$$

In other words, the interaction between the fields of antenna b ($E_b$, $H_b$) and the sources of antenna a ($J_a$, $M_a$) must be identical to the interaction between the fields of antenna a ($E_a$, $H_a$) and the sources of antenna b ($J_b$, $M_b$).

Figure 29:
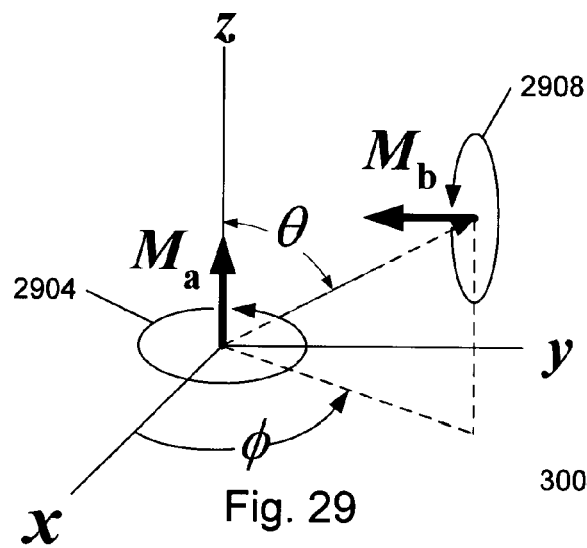
FIG. 29 shows the geometry around two small orthogonal loops.

FIG. 29 shows the geometry around two small orthogonal loops. A first small loop antenna (loop a) 2904 is characterized by a magnetic moment $M_a$ in the +z-direction and a second small loop antenna (loop b) 2908 is characterized by a magnetic moment $M_b$ in the −y-direction. Ignoring far field terms, the magnetic field of a first small loop antenna 2904 is given by:

$$H_a = H_a(2\cos\theta \hat{r} + \sin\theta \hat{\theta}) \quad (2)$$

The magnetic moment of a second small loop antenna 2908 is given by:

$$M_b = -M_y \hat{y} = -M_y(\sin\theta\sin\phi \hat{r} + \cos\theta\sin\phi \hat{\theta} + \cos\phi \hat{\phi}) \quad (3)$$

Setting $H_a \cdot M_b = 0$ yields:

$$\begin{aligned} 0 &= H_a \cdot M_b \quad (4)\\ &= -(2\cos\theta \hat{r} + \sin\theta \hat{\theta}) \cdot (\sin\theta\sin\phi \hat{r} + \cos\theta\sin\phi \hat{\theta} + \cos\phi \hat{\phi})\\ &= -3\cos\theta\sin\theta\sin\phi \end{aligned}$$

The result of (4) is zero if $\sin\theta=0$, $\cos\theta=0$, or $\sin\phi=0$. Thus $\theta=0°$, $90°$, or $180°$ or $\phi=0°$, or $180°$ yields no coupling between the loops. A minimal coupling orientation between a first small loop antenna 2904 (loop a) and a second small orthogonal loop antenna 2908 (loop b) is one which satisfies (4). Geometrically, a minimum coupling orientation (or arrangement) will occur when one loop lies either in the plane or along the axis of the other.

Figure 30:
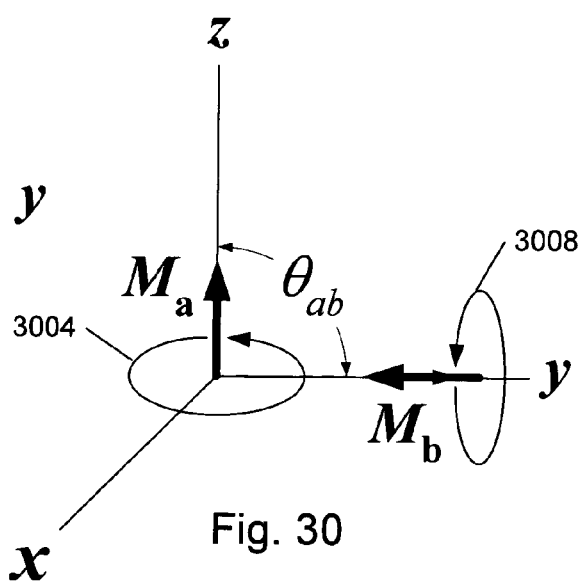
FIG. 30 shows the geometry around two small orthogonal loops in a first minimal coupling arrangement.

FIG. 30 shows the geometry around two small orthogonal loops in a first minimal coupling arrangement. In a first minimal coupling arrangement of small orthogonal loops, a second loop 3008 lies in the plane of a first loop 3004. Angle $\theta_{ab}$ from an axis of a first loop 3004 to the direction of a second loop 3008 is a right angle. A first minimal coupling arrangement of small orthogonal loops (as shown in FIG. 30) corresponds to a second small loop antenna 3008 (loop b) located at $\theta=90°$ and $\phi=90°$ relative to a first small loop antenna 3004 (loop a).

Figure 31:
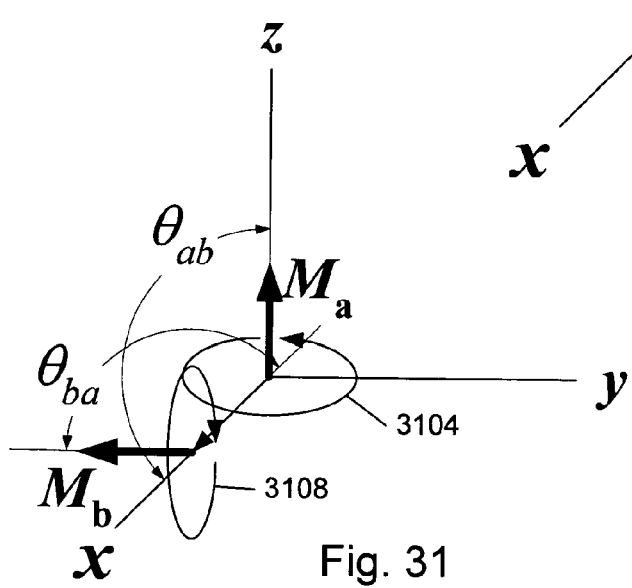
FIG. 31 shows the geometry around two small orthogonal loops in a second minimal coupling arrangement.

FIG. 31 shows the geometry around two small orthogonal loops in a second minimal coupling arrangement. In a second minimal coupling arrangement of small orthogonal loops, a second loop 3108 lies in the plane of a first loop 3104 and a first loop 3104 lies in the plane of a second loop 3108. Angle $\theta_{ab}$ from an axis of a first loop 3104 to the direction of a second loop 3108 is a right angle. Similarly angle $\theta_{ba}$ from an axis of a second loop 3108 to the direction of a first loop 3104 is a right angle. A second minimal coupling arrangement of small orthogonal loops (as shown in FIG. 31) corresponds to a second small loop antenna 3108 (loop b) located at $\theta=90°$ and $\phi=0°$ relative to a first small loop antenna 3104 (loop a).

The inventors have found that although in theory the minimal coupling arrangements of FIG. 30 and FIG. 31 should be equivalent, in practice the arrangement of FIG. 31 yields lower mutual coupling under many circumstances. Having both a first loop 3104 and a second loop 3108 each in the plane of the other yields lower mutual coupling. Other factors including ergonomic and mechanical factors may further influence choice of an arrangement.

Figure 32:
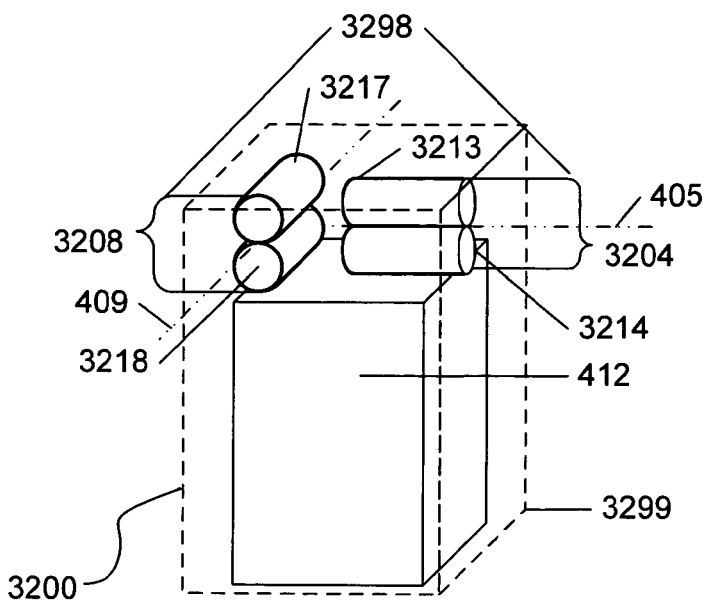
FIG. 32 shows a space efficient magnetic antenna system with two small orthogonal loop antennas in a first minimal coupling arrangement for a compact tracking device.

FIG. 32 shows two small orthogonal loop antennas in a first minimal coupling arrangement for a compact tracking device 3200. Compact tracking device 3200 comprises RF module 412, enclosure 3299, and a space efficient magnetic antenna system 3298 further comprising a first magnetic antenna 3204 and a second magnetic antenna 3208. A first magnetic antenna 3204 has a null generally aligned along first null axis 405. A second magnetic antenna 3408 has a null generally aligned along second null axis 409. A first null axis 405 is substantially orthogonal to a second null axis 409.

A first magnetic antenna system 3204 further comprises a first magnetic antenna component 3213 and a second magnetic antenna component 3214 (collectively, a "first set of magnetic antenna components"). A first set of magnetic antenna components is generally aligned along axes co-parallel to a first null axis 405. A first magnetic antenna system 3204 is depicted as having two components for purpose of illustration and not limitation. In alternate embodiments, a first magnetic antenna system 3204 may further comprise more than two components or a single component.

A second magnetic antenna system 3208 further comprises a third magnetic antenna component 3217 and a fourth magnetic antenna component 3218 (collectively, "second set of magnetic antenna components"). A second set of magnetic antenna components are all generally aligned along axes co-parallel to second null axis 409. A second magnetic antenna system 3208 is depicted as having two components for purpose of illustration and not limitation. In alternate embodiments, a second magnetic antenna system 3208 may further comprise more than two components or a single component.

Figure 33:
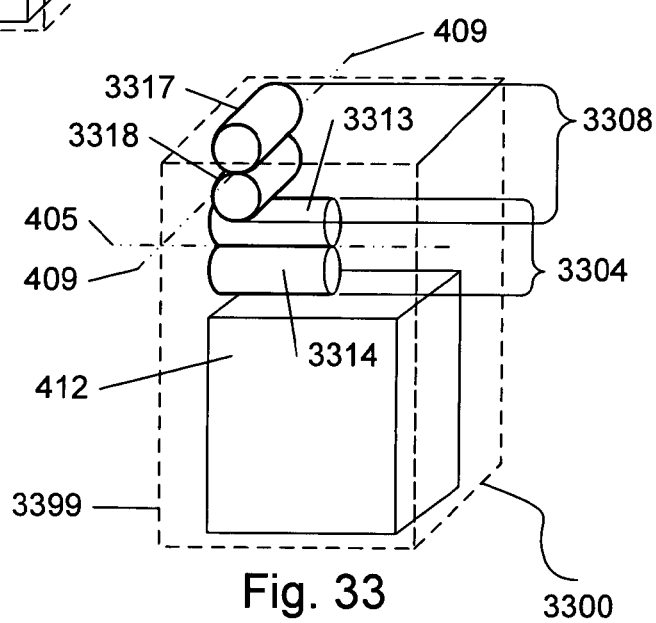
FIG. 33 shows a space efficient magnetic antenna system with two small orthogonal loop antennas in a second minimal coupling arrangement for a compact tracking device.

FIG. 33 shows two small orthogonal loop antennas in a second minimal coupling arrangement for a compact tracking device 3300. Compact tracking device 3300 includes RF module 412, enclosure 3399, and a space efficient magnetic antenna system 3398 further comprising first magnetic antenna 3304 and second magnetic antenna 3308. First magnetic antenna 3304 has a null generally aligned along first null axis 405. Second magnetic antenna 3308 has a null generally aligned along second null axis 409. First null axis 405 is substantially orthogonal to second null axis 409.

A first magnetic antenna system 3304 further comprises a first magnetic antenna component 3313 and a second magnetic antenna component 3314 (collectively, "first set of magnetic antenna components"). A first set of magnetic antenna components are all generally aligned along axes co-parallel to first null axis 405. A first magnetic antenna system 3304 is depicted as having two components for purpose of illustration and not limitation. In alternate embodiments, a first magnetic antenna system 3304 may further comprise more than two components or a single component.

A second magnetic antenna system 3308 further comprises a third magnetic antenna component 3317 and a fourth magnetic antenna component 3318 (collectively, a "second set of magnetic antenna components"). A second set of magnetic antenna components are all generally aligned along axes co-parallel to a second null axis 409. A second magnetic antenna system 3308 is depicted as having two components for purpose of illustration and not limitation. In alternate embodiments, a second magnetic antenna system 3208 may further comprise more than two components or a single component.

Figure 34:
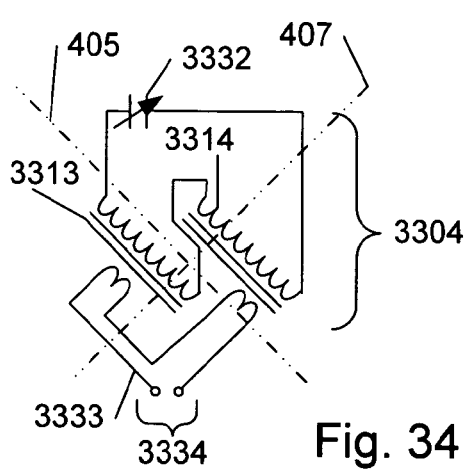
FIG. 34 presents a potential circuit diagram for a magnetic loopstick antenna.

FIG. 34 presents a potential circuit diagram for a magnetic loopstick antenna 3304. A magnetic loopstick antenna 3304 comprises a first magnetic antenna component 3313 and a second magnetic antenna component 3314 (collectively, "a set of magnetic antenna components"). In a preferred embodiment, a magnetic loopstick antenna 3304 further comprises tuning means 3332, a secondary coupling coil 3333 and coupling coil terminals 3334.

A first set of magnetic antenna components are aligned and connected so as to have a generally constructive addition of patterns substantially along pattern axis 407 and nulls generally co-parallel with null axis 405. For best results, the sense of currents in a first magnetic antenna component 3313 and a second magnetic antenna component 3314 should be the same so that the patterns of a set of magnetic components add up constructively. Similarly for best results, secondary coupling coil 3333 should couple to each of a set of magnetic components with the same sense so as to yield maximal transmission of power (or conversely, maximal sensitivity to received signals) from coupling coil terminals 3334.

A set of magnetic antenna components may be loopstick antenna or other inductive components. In preferred embodiments, a set of magnetic components do not share a common ferrite core.

Figure 35:
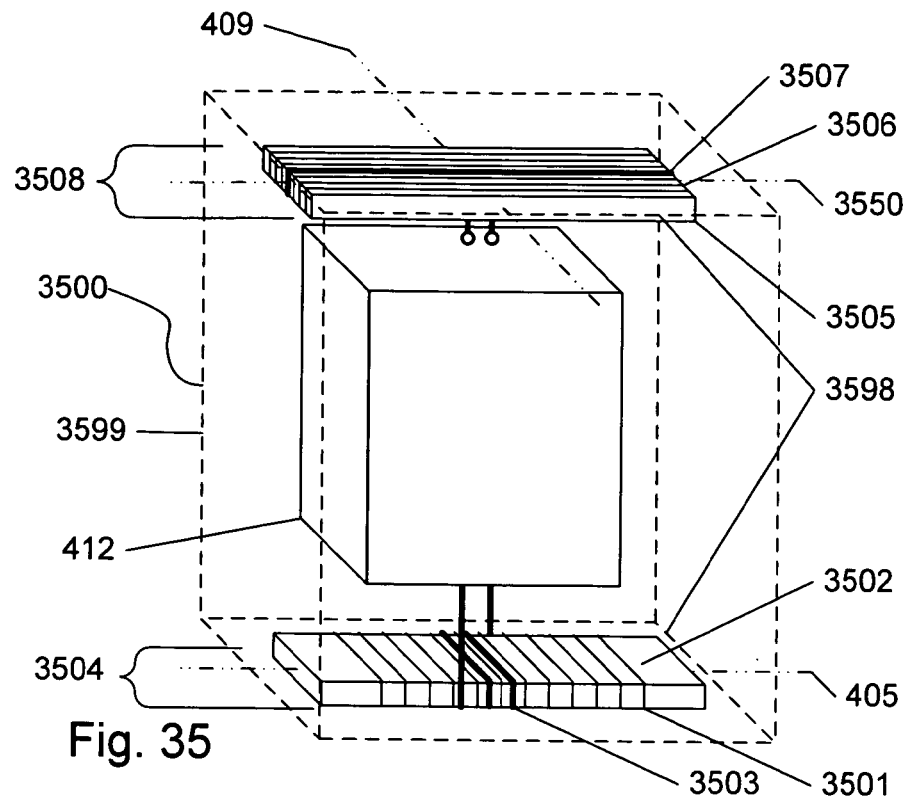
FIG. 35 shows a space efficient magnetic antenna system with a small orthogonal loop antenna characterized by a null axis orthogonal to a principal axis.

FIG. 35 shows a space efficient magnetic antenna system 3598 with a small orthogonal loop antenna 3508 characterized by a null axis 409 orthogonal to a principal axis 3550. In an alternate embodiment, a space efficient magnetic antenna system 3598 comprises a first magnetic antenna 3504 and a second magnetic antenna 3508. A first magnetic antenna 3504 further comprises a first bar 3502, a first primary coil 3501, and a first secondary coil 3503. A second magnetic antenna 3508 further comprises a second bar 3505, a second primary coil 3506, and a second secondary coil 3507. A first magnetic antenna 3504 has first null axis 405. A second magnetic antenna 3508 has second null axis 409. A second null axis 409 is substantially orthogonal to a first null axis 405. A second bar 3505 has a principal axis 3550. A principal axis 3550 is preferentially an axis of symmetry of a second bar 3505. In addition, a principal axis 3550 is substantially aligned with the dimension of greatest extent of a second bar 3505. A second primary coil 3506, and a second secondary coil 3507 cooperate with a second bar 3505 to create a null axis 409 substantially orthogonal to a principal axis 3550. A first bar 3502 and a second bar 3505 are preferentially ferrite bars, but in alternate embodiments may be any other material suitable for use in a magnetic antenna. In the context of the present invention, terms like "rod," "bar," or "core" may be used interchangeably to refer to a material incorporated in a magnetic antenna for either mechanical support or for the benefit of high permeability.

Figure 1:
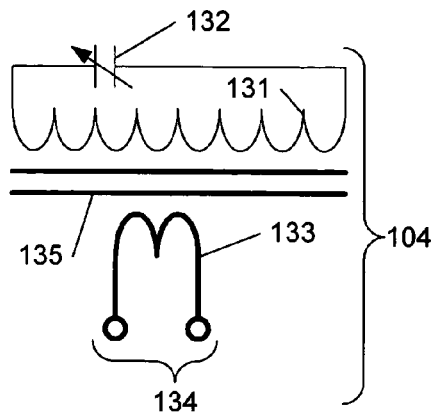
FIG. 1 is a circuit diagram showing a prior art loopstick antenna configuration.
Figure 2:
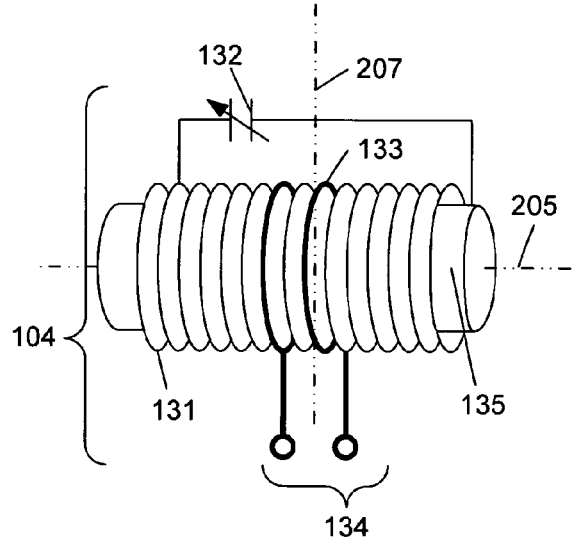
FIG. 2 is a schematic diagram illustrating a prior art loopstick antenna arrangement.

In many prior art loopstick antennas (like that of FIG. 1) loopstick axis 205 is both a principal axis as well as a null axis. In the alternate embodiment of FIG. 35, a second magnetic antenna 3508 is characterized by a null axis 409 that is not substantially co-parallel to a principal axis 3505. In fact, in the alternate embodiment of FIG. 35 a null axis 409 is substantially orthogonal to a principal axis 3505. A space efficient magnetic antenna system 3598 further cooperates with an RF module 412 and an enclosure 3599 to create a compact tracking device 3500.

Figure 36:
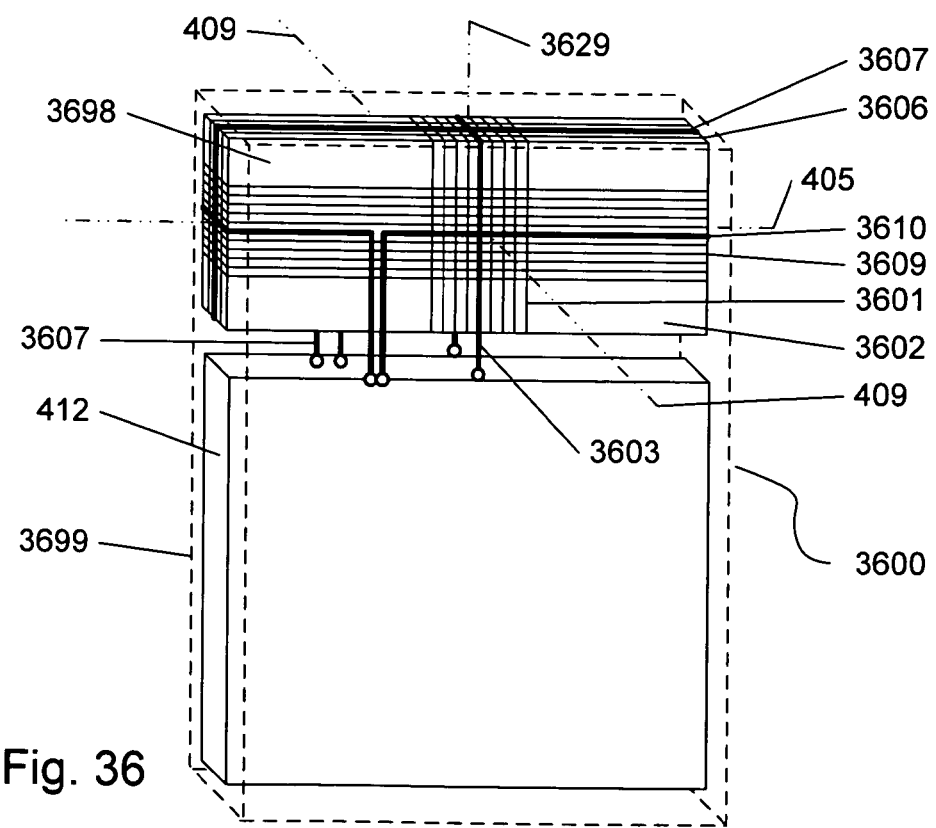
FIG. 36 shows a space efficient magnetic antenna system with three mutually orthogonal antennas on a common ferrite.

FIG. 36 shows a space efficient magnetic antenna system 3698 with three mutually orthogonal magnetic antennas on a common core 3602. Space efficient magnetic antenna system 3698 comprises three mutually orthogonal antennas. A first primary coil 3601, a first secondary coil 3603, and a common core 3602 cooperate as a first magnetic antenna with a first null axis 405. A second primary coil 3606, a second secondary coil 3607, and a common core 3602 cooperate as a second magnetic antenna with a second null axis 409. A second null axis 409 is substantially orthogonal to a first null axis 405. A third primary coil 3609, a third secondary coil 3610, and a common core 3602 cooperate as a third magnetic antenna with a third null axis 3629. A third null axis 3629 is substantially mutually orthogonal to a first null axis 405 and a second null axis 409. Compact tracking device 3600 includes RF module 412, enclosure 3699, and a space efficient magnetic antenna system 3698. In alternate embodiments, a space efficient magnetic antenna system 3698 may comprise either one or two magnetic antennas.

A first null axis 405 is also a principal axis 405 of a common core 3602. A principal axis 405 of a common core 3602 is generally aligned with the dimension of greatest extent of a common core 3602. Thus a second magnetic antenna is characterized by a second null axis 409 that is substantially orthogonal to a principal axis 405 of an associated common ferrite core 3602. A common core 3602 is preferentially a ferrite core, but in alternate embodiments may be any other material suitable for use in a magnetic antenna.

A second null axis 409 is also a secondary axis 409 of a common core 3602. A common core 3602 is shown with much less extent along a secondary axis 409 than along a principal axis 405. A substantial difference in extent along a secondary axis 409 relative to a principal axis 405 is beneficial for enabling a compact tracking device with a low profile form factor, such as a "credit-card" form factor. In alternate embodiments, there may be no substantial difference in extent along a secondary axis 409 relative to a principal axis 405.

Figures 37, 38:
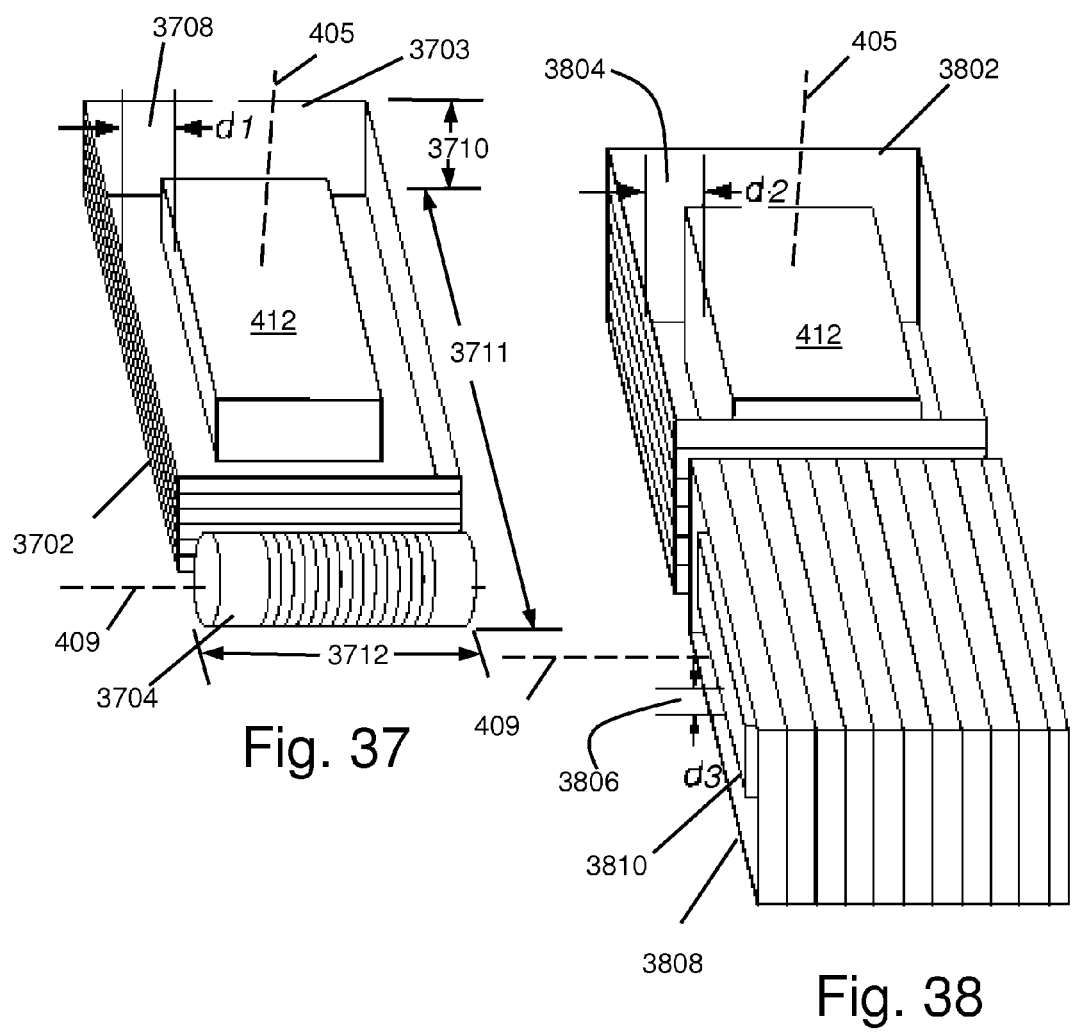
FIG. 37 shows an exemplary space efficient antenna embodiment having a first magnetic antenna wound outside of and surrounding an electronics module.
FIG. 38 shows a system having two orthogonal magnetic antennas.

FIG. 37 shows an exemplary space efficient antenna embodiment having a first magnetic antenna wound outside of and surrounding an electronics module 412. The coil is spaced a predetermined distance d1 3708 from the electronics module. Spacing d1 allows a substantial portion of the magnetic field of coil 3702 to pass unimpeded, thus preserving much of the inductance and sensitivity of antenna 3702. The antenna system of FIG. 37 also includes a second magnetic antenna 3704 oriented with a null axis orthogonal to the null axis of antenna 3702. Coil 3702 is preferably wound at the maximum extent practical for a device associated with the antenna and electronics module. For example the coil 3702 may be wound around the outside of the package 3703 and then coated or overmolded for protection. Alternatively, coil 3702 may be formed on the inside of the package 3703. Distance d1 3708 is preferably 10% to 90% of a distance from the center (or center line) of the coil to the inside edge of the coil 3702.

The dimensions of the antenna system are shown for reference. The height 3710 is shown. The length 3711 includes the two coils. The width 3712 is the width of coil 3702 which is the maximum in this direction. The terms length, width, height are for illustration purposes and may be interchanged as desired. The length of a coil as used in the art is often in reference to the winding axis dimension, even if the length is the shortest dimension. FIG. 37 shows a rectangular device; however, any device including round or irregular may be characterized by an orthogonal set of dimensions: length, width, and height.

A second magnetic antenna 3408 has a null generally aligned along second null axis 409. The first null axis 405 of coil 3702 is substantially orthogonal to the second null axis 409 of coil 3704. Null axis 405 and null axis 409 are typically aligned in accordance with a plane defining the coverage desired for the system, e.g., a horizontal plane. In typical operation, the device is normally held in position so that axis 405 and axis 409 are horizontal (parallel to a horizontal plane). The second antenna may be similar to antenna 408 of FIG. 5. The second magnetic antenna system 3704 is depicted as having one component for purpose of illustration and not limitation. In alternate embodiments, a second magnetic antenna system 3208 may further comprise more than a single component, for example antenna 3204 of FIG. 32. Second magnetic antenna 3704 is shown outside antenna 3702; however antenna 3704 may be located inside antenna 3702 at the bottom or at the side in space d1 3708 between the first antenna 3702 and the electronics package 412.

As a further property of the arrangement of FIG. 37, the second antenna 3704 is positioned and oriented for minimum coupling between antennas 3704 and 3702 by virtue of the centered position of coil 3704 at the end of coil 3702. Alternative minimum coupling positions and orientations may also be used.

In one embodiment, the antenna arrangement of FIG. 37 (and also FIG. 38) is designed so that the antenna system substantially fills the available dimensions, for example, length, width, and height for a given device. Note also that potentially at least part, and possibly all of the electronics needed with the antenna in the same package as the antenna is placed substantially within the volume defined by the maximum dimensions of the antenna system, except for incidental items. Such incidental items as controls, displays, connectors, moldings, and coatings may be required to extend outside the antenna dimensions. Note further that in one embodiment, the winding of the antenna coil may be distributed along the full length of the available winding axis dimension 409 or 412. See especially antennas 3702, 3802 and 3808. The winding, as well as the other dimensions of the antenna system should preferably enclose at least 75%, more preferably at least 85%, and more preferably at least 95% of each dimension (length, width, height) of the device, i.e., the outside package dimension of the device including the antenna system. Often the ability to make the antenna such a large percentage of the package dimension is enabled in part by placing most (greater than 50%, preferably greater than 75%, preferably greater than 95%) if not all of the associated electronics within the volume defined by the length, width, height of the antenna system, in one embodiment in particular, within the interior length, width, height of one or more individual antennas of the antenna system (see also FIG. 38).

In further embodiments, a third magnetic antenna may be included, wound around the enclosure in the remaining orthogonal direction. Alternatively, an electric field antenna may be added for alternative coverage.

FIG. 38 shows a system having two orthogonal magnetic antennas. The first magnetic antenna is formed similar to antenna 3702 of FIG. 37, i.e., wound around an electronics module 412 and spaced a distance at least d2 3804 from the electronics module. The second magnetic antenna 3808 may be orthogonal in directionality, i.e., the null axis 405 of antenna 3808 may be orthogonal to the null axis 409 of antenna 3802. Antennas 3802 and 3808 may be oriented in accordance with a predetermined plane in the manner described for antenna 3702 and 3704 of FIG. 37. Antenna 3808 may be wound around a second electronics module 3810 and spaced a distance d3 3806 from the second electronics module 3810. Electronics modules 412 and 3810 may cooperate together to perform the functionality of the device and may be connected by any necessary wires or cables. Coils 3702, 3802, and 3808 are shown completely enclosing the respective electronics modules for illustration purposes; however, the coils may only partially enclose the modules in accordance with design requirements or preferences. For example, the coils 3802 and 3808 may have ¼ the length, i.e., ¼ the number of turns as shown.

As a further property of the arrangement of FIG. 38, the second antenna 3808 is positioned and oriented for minimum coupling between antennas 3808 and 3802 by virtue of the centered position of coil 3808 at the end of coil 3802. Alternative minimum coupling positions and orientations may also be used.

In a further embodiment, antenna 3802 and 3808 may both be wound around electronics module 412, substantially enclosing electronics module 412 within each respective antenna. In a further embodiment, a third mutually orthogonal magnetic antenna (orthogonal to both 3802 and 3808 may be wound around electronics module 412, with each respective antenna substantially enclosing electronics module 412.

CONCLUSION

Although the present invention is illustrated in terms of ferrite materials, one skilled in the RF arts will realize that other magnetic materials (like iron), non-magnetic materials (like plastic or printed circuit board materials), an air core, or even meta-materials may be acceptable substitutes or alternatives for ferrite in a magnetic antenna. Thus, use of terms like "ferrite" in the present invention should be understood as being illustrative, not limiting.

A space efficient magnetic antenna system is of particular value in conjunction with an RF module and when used as a component in a system for wireless tracking. Magnetic antennas are well suited for applications requiring an antenna to be mounted against a human body, an asset, or other objects being tracked. Further, a space efficient magnetic antenna system enables a compact tracking device. A compact tracking device is highly prized in a wireless tracking application. Space efficient magnetic antennas are of value for enabling compact devices for a host of other applications as well, including, but not limited to, Radio Frequency Identification (RFID), low data rate Near-Field Communications (NFC), wireless power transfer, and Real-Time Location Systems (RTLS).

Specific applications have been presented solely for purposes of illustration to aid the reader in understanding a few of the great many contexts in which the present invention will prove useful. It should also be understood that, while the detailed drawings and specific examples given describe preferred embodiments of the invention, they are for purposes of illustration only, that the system and method of the present invention are not limited to the precise details and conditions disclosed and that various changes may be made therein without departing from the spirit of the invention.

We claim:

1. A method for providing an omnidirectional space efficient magnetic antenna system, said method comprising:
   generating a first magnetic antenna having a first antenna null axis
   generating a second magnetic antenna having a second antenna null axis;
   aligning said second antenna null axis substantially orthogonal to said first antenna null axis; and
   positioning said second magnetic antenna in a minimal coupling orientation with respect to said first magnetic antenna at a first center to center distance from said first magnetic antenna; said minimal coupling orientation providing at least 10 dB decoupling between said first magnetic antenna and said second magnetic antenna compared with a configuration providing a maximum coupling achievable between said first magnetic antenna and said second magnetic antenna at said first center to center distance from said first magnetic antenna to said second magnetic antenna wherein said first antenna and said second magnetic antenna are together positioned while maintaining an orthogonal relationship;
   said first magnetic antenna having a first length dimension corresponding to said first antenna null axis and said second magnetic antenna having a second length dimension corresponding to said second antenna null axis; said first length dimension of said first magnetic antenna being not equal to said second length dimension of said second magnetic antenna;
   said omnidirectional space efficient magnetic antenna system providing omnidirectional coverage using said first magnetic antenna in combination with said second magnetic antenna.

2. The method as recited in claim 1, wherein said step of generating said first magnetic antenna further includes the step of:
   winding a coil of said first magnetic antenna around a loopstick axis; wherein said coil comprises turns lying parallel to a plane, said plane at a substantial diagonal angle from said loopstick axis.

3. The method as recited in claim 1, further including an RF module having at least one characteristic physical dimension, wherein said first magnetic antenna has said first antenna null axis at a substantial diagonal angle from said at least one characteristic physical dimension;
   wherein the at least one characteristic physical dimension is one of the group consisting of overall length, overall width, and overall height.

4. The method as recited in claim 1, further including the step of:
   embedding said first magnetic antenna and said second magnetic antenna in clothing; wherein the first antenna null axis of said first magnetic antenna is substantially perpendicular to the second antenna null axis of said second magnetic antenna, said first antenna null axis and said second antenna null axis lying substantially in a horizontal plane.

5. The method as recited in claim 1, further including an RF module and further including the step of:
   said RF module alternately utilizing said first magnetic antenna and said second magnetic antenna.

6. The method as recited in claim 1, further including an RF module and further including the step of:
   said RF module employing said second magnetic antenna in phase quadrature relative to said first magnetic antenna.

7. The method as recited in claim 1, further including the step of:
   generating a third magnetic antenna with a third antenna null axis mutually orthogonal to said first antenna null axis and said second antenna null axis.

8. A method for providing an omnidirectional space efficient magnetic antenna system including an RF module, said method comprising:
   generating a first magnetic antenna having a first null axis aligned in accordance with a predetermined plane;
   generating a second magnetic antenna having a second null axis;
   aligning said second null axis substantially orthogonal to said first null axis;
   positioning said second magnetic antenna in a minimal coupling orientation with respect to said first magnetic antenna at a first center to center distance from said first magnetic antenna; said minimal coupling orientation providing at least 10 dB decoupling between said first magnetic antenna and said second magnetic antenna compared with a configuration providing a maximum coupling achievable between said first magnetic antenna and said second magnetic antenna at said first center to center distance from said first magnetic antenna to said second magnetic antenna wherein said first antenna and said second magnetic antenna are together positioned while maintaining an orthogonal relationship;
   said first magnetic antenna has having a first length dimension corresponding to said first null axis and said second magnetic antenna having a second length dimension corresponding to said second null axis; said first length dimension of said first magnetic antenna being not equal to said second length dimension of said second magnetic antenna;
   said RF module capable of transmitting or receiving omnidirectionally using said first magnetic antenna in combination with said second magnetic antenna.

9. The method as recited in claim 8, further including the step of:
said RF module alternately utilizing said first magnetic antenna and said second magnetic antenna.

10. The method as recited in claim 8, and further including the step of:
said RF module utilizing said second magnetic antenna in phase quadrature relative to said first magnetic antenna.

11. The method as recited in claim 8, further including the step of:
generating a third magnetic antenna with a third null axis mutually orthogonal to said first null axis and said second null axis.

12. The method as recited in claim 8, wherein said first magnetic antenna further comprises a bar, said bar is characterized by a principal axis corresponding to the greatest dimension of the group consisting of overall length, overall width, and overall height of said bar, said principal axis is characterized by an orientation relative to said first null axis, and said orientation of said principal axis is not substantially co-parallel to said first null axis.

13. The method as recited in claim 3, wherein said first length dimension corresponding to said first antenna null axis is greater than a width of said first magnetic antenna; and
said second length dimension corresponding to said second antenna null axis is less than a width of said second magnetic antenna.

14. The method as recited in claim 13, wherein said first length dimension corresponding to said first antenna null axis is equal to said width dimension of said second magnetic antenna.

15. A method for providing an omnidirectional space efficient magnetic antenna system for an RF module, said method comprising:
generating a first magnetic antenna having a first null axis aligned in accordance with a predetermined plane;
generating a second magnetic antenna having a second null axis;
aligning said second null axis substantially orthogonal to said first null axis;
aligning said second null axis in accordance with said predetermined plane;
positioning said second magnetic antenna in a minimal coupling orientation with respect to said first magnetic antenna at a first center to center distance from said first magnetic antenna; said minimal coupling orientation providing at least 10 dB decoupling between said first magnetic antenna and said second magnetic antenna compared with a configuration providing a maximum coupling achievable between said first magnetic antenna and said second magnetic antenna at said first center to center distance from said first magnetic antenna to said second magnetic antenna wherein said first antenna and said second magnetic antenna are together positioned while maintaining an orthogonal relationship;
positioning said RF module interposed directly between said first magnetic antenna and said second magnetic antenna within a package enclosure that encloses said first magnetic antenna and said second magnetic antenna and said RF module; said RF module comprising active circuitry configured for transmitting or receiving omni-directionally using said first magnetic antenna and said second magnetic antenna;
said first magnetic antenna having a first length dimension corresponding to said first null axis and said second magnetic antenna having a second length dimension corresponding to said second null axis; said first length dimension of said first magnetic antenna being not equal to said second length dimension of said second magnetic antenna;
said omnidirectional near field magnetic antenna system providing omnidirectional coverage using said first magnetic antenna in combination with said second magnetic antenna.

16. The method as recited in claim 15, further including the step of:
said RF module alternately utilizing said first magnetic antenna and said second magnetic antenna on a same frequency.

17. The method as recited in claim 15, further including the step of:
said RF module employing said second magnetic antenna in phase quadrature relative to said first magnetic antenna.

18. The method as recited in claim 15, further including the step of:
generating a third magnetic antenna with a third null axis mutually orthogonal to said first null axis and said second null axis.

* * * * *